(12) United States Patent
Chiang

(10) Patent No.: US 8,823,670 B2
(45) Date of Patent: Sep. 2, 2014

(54) METHOD FOR SCREEN CONTROL ON TOUCH SCREEN

(75) Inventor: Tzu-Pang Chiang, Taipei (TW)

(73) Assignee: BenQ Corporation, Taipei (TW)

( * ) Notice: Subject to any disclaimer, the term of this patent is extended or adjusted under 35 U.S.C. 154(b) by 142 days.

(21) Appl. No.: 13/600,953

(22) Filed: Aug. 31, 2012

(65) Prior Publication Data

US 2013/0113729 A1 May 9, 2013

(30) Foreign Application Priority Data

Nov. 7, 2011 (TW) .............................. 100140517 A

(51) Int. Cl.
*G06F 3/041* (2006.01)

(52) U.S. Cl.
CPC ....................................... *G06F 3/041* (2013.01)
USPC ........................................... 345/173; 715/863

(58) Field of Classification Search
USPC ......... 345/156, 173; 178/18.01; 715/702, 863
See application file for complete search history.

(56) References Cited

U.S. PATENT DOCUMENTS

| | | | |
|---|---|---|---|
| 7,526,737 B2* | 4/2009 | Simmons et al. ............. | 715/856 |
| 8,212,788 B2* | 7/2012 | Lam ............... | 345/173 |
| 8,648,823 B2* | 2/2014 | Koch et al. .................... | 345/173 |
| 8,650,507 B2* | 2/2014 | Westerman et al. .......... | 715/863 |
| 2006/0001650 A1* | 1/2006 | Robbins et al. ............... | 345/173 |
| 2008/0052945 A1* | 3/2008 | Matas et al. .................... | 34/173 |
| 2009/0094562 A1* | 4/2009 | Jeong et al. .................... | 715/863 |
| 2009/0261432 A1* | 10/2009 | Wilner ........................... | 257/418 |
| 2009/0282370 A1* | 11/2009 | Rainwater et al. ............ | 715/863 |
| 2010/0020025 A1* | 1/2010 | Lemort et al. ................ | 345/173 |
| 2010/0050076 A1* | 2/2010 | Roth ............................ | 715/702 |
| 2010/0088641 A1* | 4/2010 | Choi ............................. | 715/828 |
| 2010/0090971 A1* | 4/2010 | Choi et al. ..................... | 345/173 |
| 2010/0097338 A1* | 4/2010 | Miyashita et al. ............ | 345/173 |
| 2011/0055753 A1* | 3/2011 | Horodezky et al. .......... | 715/810 |
| 2011/0074827 A1* | 3/2011 | Griffin et al. ................. | 345/661 |
| 2011/0209039 A1* | 8/2011 | Hinckley et al. .............. | 715/206 |
| 2011/0210850 A1* | 9/2011 | Tran .............................. | 340/540 |
| 2011/0231796 A1* | 9/2011 | Vigil ............................. | 715/810 |
| 2011/0273479 A1* | 11/2011 | Ingrassia, Jr. et al. ........ | 345/666 |
| 2012/0092266 A1* | 4/2012 | Akella .......................... | 345/173 |
| 2012/0194445 A1* | 8/2012 | Chang et al. .................. | 345/173 |
| 2012/0216150 A1* | 8/2012 | Wernecke ..................... | 715/850 |
| 2012/0223890 A1* | 9/2012 | Borovsky et al. ............. | 345/173 |
| 2012/0236026 A1* | 9/2012 | Hinckley et al. ............. | 345/629 |
| 2013/0080979 A1* | 3/2013 | Weir et al. ..................... | 715/856 |
| 2013/0117664 A1* | 5/2013 | Chiang ......................... | 715/247 |

FOREIGN PATENT DOCUMENTS

| | | |
|---|---|---|
| CN | 101667089 B | 8/2011 |
| TW | 200834402 A | 8/2008 |
| TW | M412349 U1 | 9/2011 |

* cited by examiner

*Primary Examiner* — Joe H Cheng

(57) ABSTRACT

A method for screen control on a touch screen is disclosed. The method is used for controlling an on-screen object on a touch screen. The method includes: determining whether an object touches a location at least two times or whether the object stays at a location for a predefined period; in response to an affirmative determination, setting the location as a starting point; detecting an ending point; computing a traveling distance and a traveling direction according to the starting point and the ending point; determining a action speed and a action direction of the on-screen object, wherein the action speed is proportional to the traveling distance and the action direction is parallel to the traveling direction; and moving the on-screen object according to the action speed and the action direction.

17 Claims, 24 Drawing Sheets

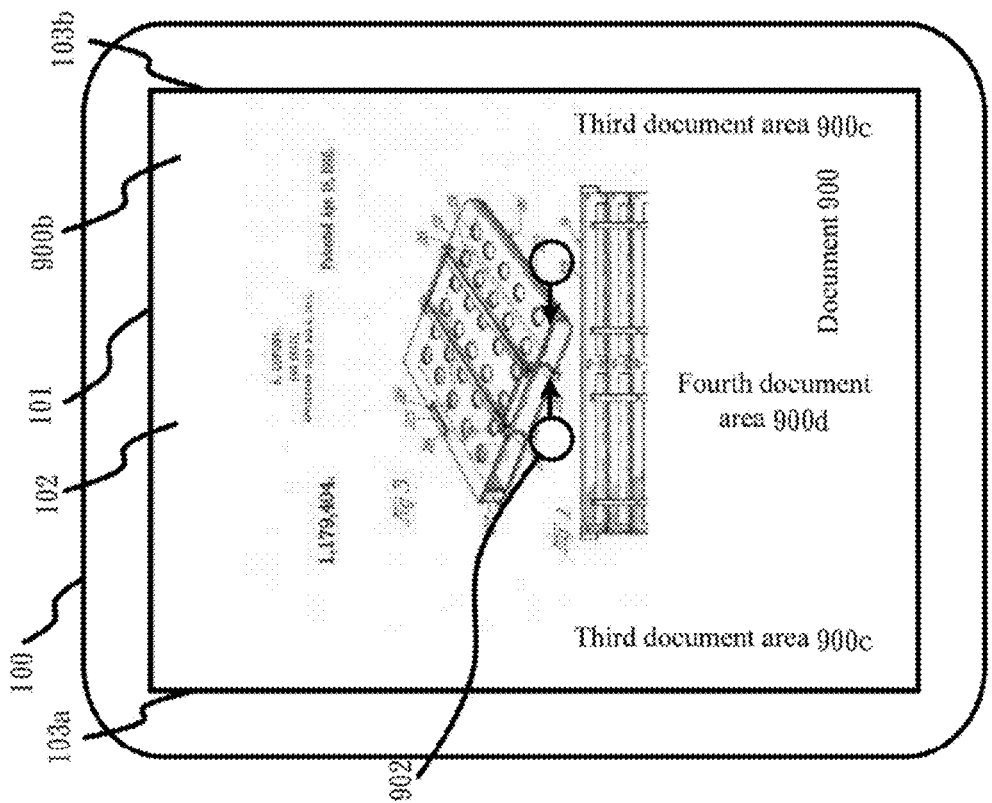
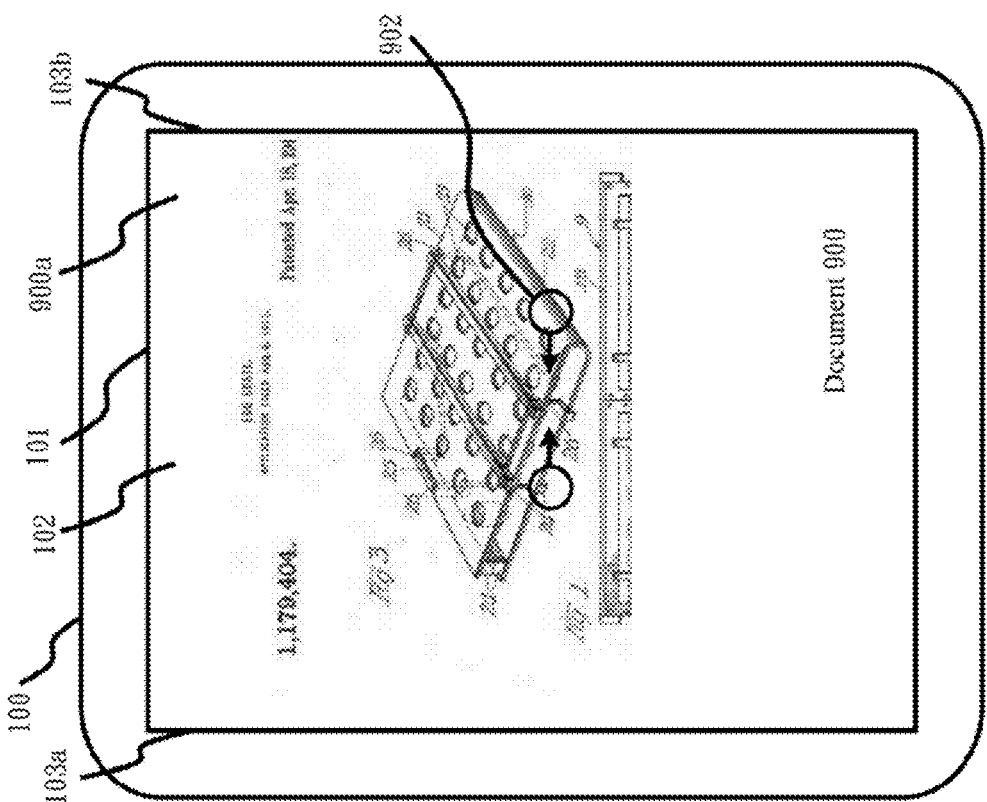
FIG. 11(A)
FIG. 11(B)

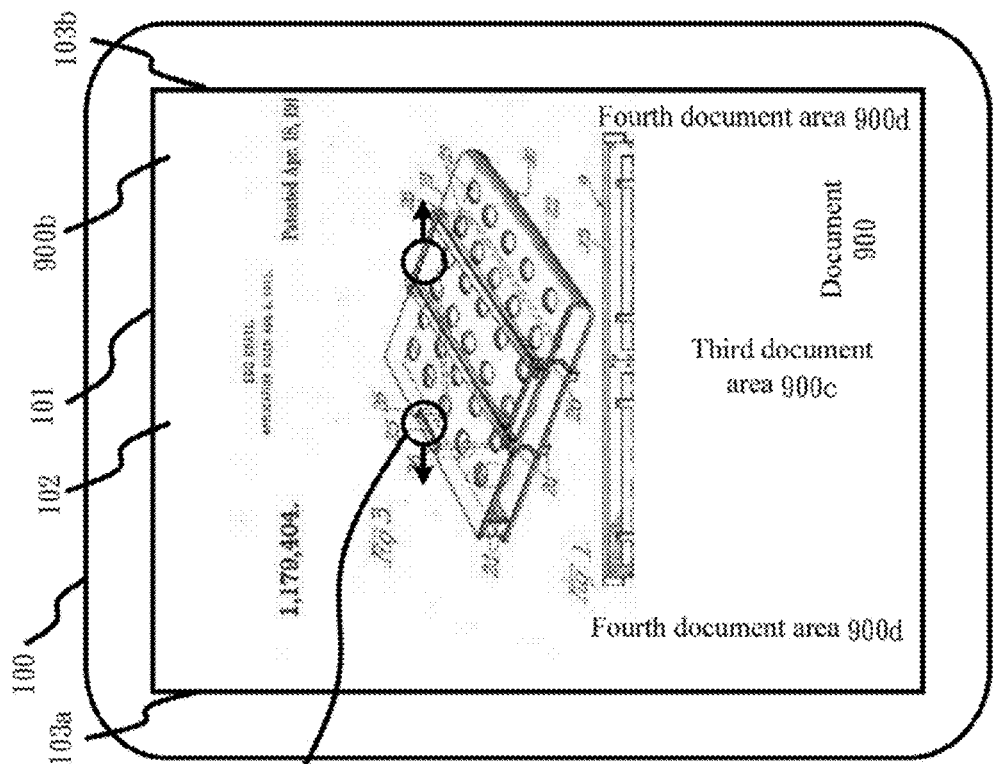
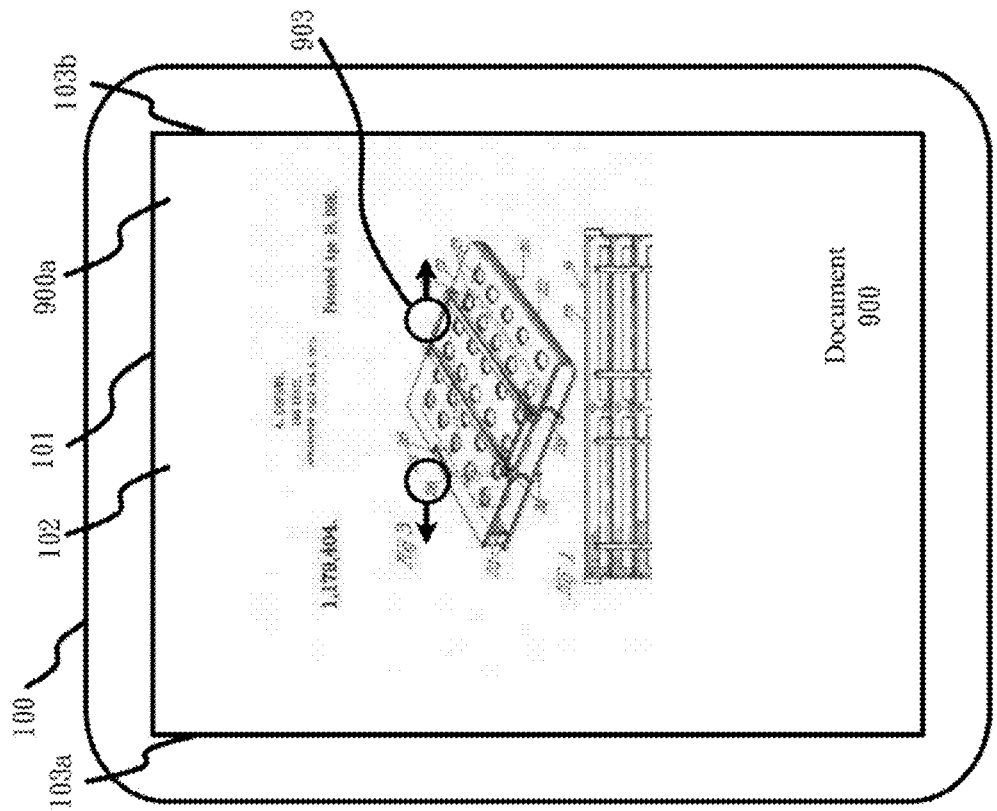
FIG. 13(B)
FIG. 13(A)

METHOD FOR SCREEN CONTROL ON TOUCH SCREEN

BACKGROUND OF THE INVENTION

1. Field of the Invention

The present invention relates to a method for screen control; more particularly, the present invention relates to a method for screen control applied on a touch screen.

2. Description of the Related Art

With the popularity of touch control techniques, electronic devices with touch control functions have become a trend, and thus more and more manufacturers start to put research and development resources in related technical fields. The most representative products of all are smart phones and tablet computers. Unlike conventional cell phones designed with many buttons or complex menu systems for performing various functions, smart phones with touch control functions can perform operations simply according to changes of touch gestures. Therefore, cell phone makers set the development of easy-to-operate user interfaces as their primary task, and thus the design of the user interface becomes one of the most challenging tasks for the cell phone makers.

Because the size of the display of the cell phone or the tablet computer is not very large, usually an entire screen cannot be completely displayed during the operations of web surfing, electronic document editing, or the like. Therefore, a user has to constantly perform actions such as moving, scrolling, rotating, zooming in, or zooming out. However, such actions may easily cause burden to the user if the performance is not intuitive enough.

Therefore, there is a need to provide a method for screen control on a touch screen to mitigate and/or obviate the aforementioned problems.

SUMMARY OF THE INVENTION

It is an object of the present invention to provide a method for screen control on a touch screen used for controlling an on-screen object on the touch screen.

To achieve the abovementioned objects, according to one embodiment of the present invention, the method for screen control on a touch screen of the present invention comprises the following steps: detecting a traveling path of an object on or close to the touch screen, including: determining whether the object touches or is close to a location of the touch screen at least two times within a predefined period, or whether the object stays at a location for a predefined period; in response to an affirmative determination, setting the location as a starting point of the traveling path; and detecting a first ending point of the traveling path. The method further comprises: computing a first traveling distance and a first traveling direction of the traveling path according to the starting point and first ending point; determining a first action direction and a first action speed of the on-screen object according to the first traveling distance and the first traveling direction, wherein the first action speed is proportional to the first traveling distance, and the first action direction is parallel to the first traveling direction; and moving the on-screen object according to the first action direction and the first action speed.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views:

FIGS. 11(A)-11(D) illustrate schematic drawings of zooming out the on-screen object according to one embodiment of the method for screen display on a touch screen of the present invention.

FIGS. 13(A)-13(D) illustrate schematic drawings of zooming in the on-screen object according to one embodiment of the method for screen display on a touch screen of the present invention.

DETAILED DESCRIPTION OF THE PREFERRED EMBODIMENT

The present invention provides a method for screen control and a method for screen display on a touch screen. According to one embodiment of the present invention, the present invention can be implemented in any electronic device equipped with a touch screen or a touch panel, such as a tablet computer, a smart phone, a laptop computer, or the like. Further, the present invention can be implemented, but not limited to, by means of being pre-installed in an operating system (OS), or installing an application (APP) in the above electronic device.

Figure 1:
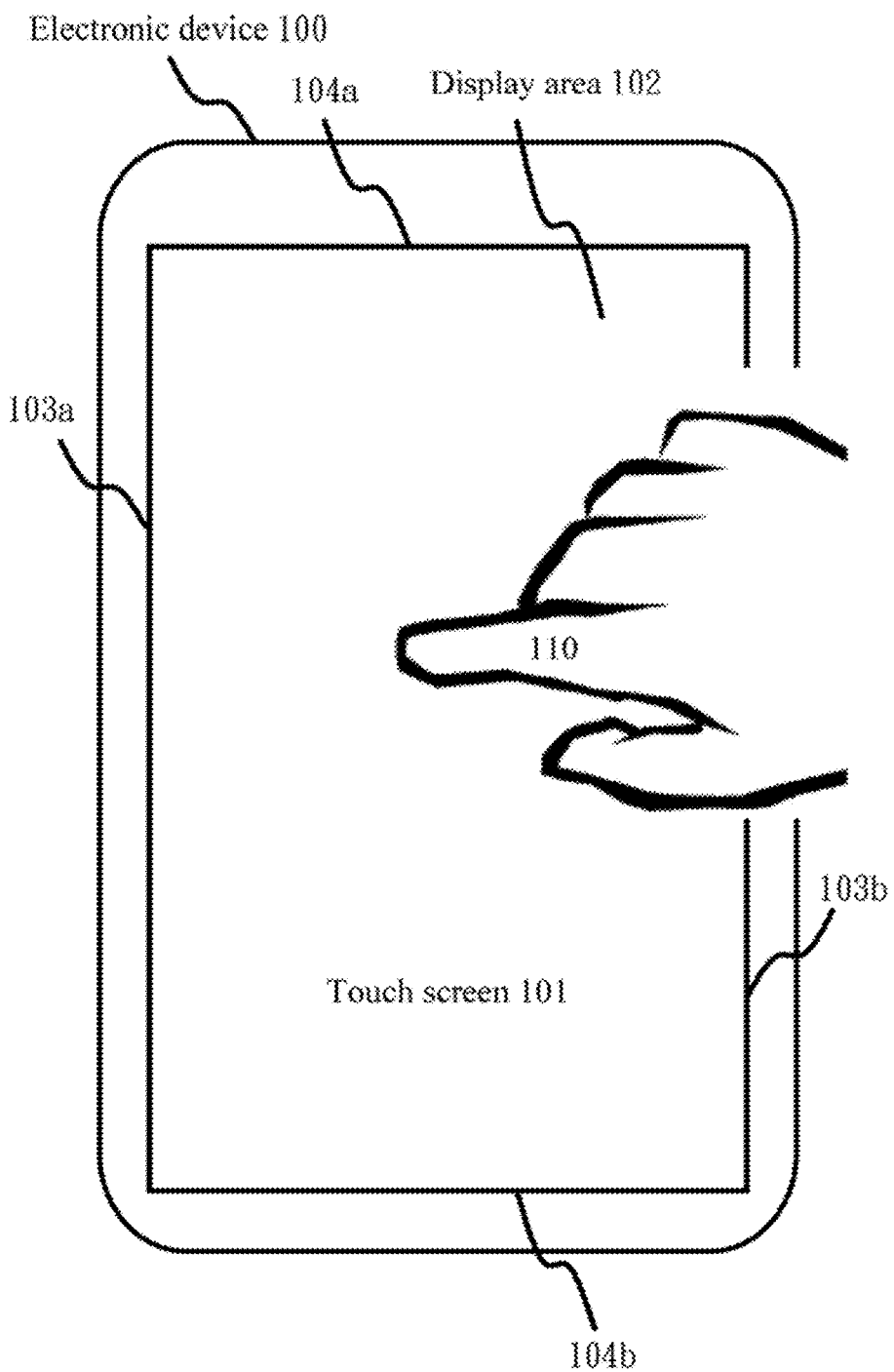
FIG. 1 illustrates a schematic drawing of an electronic device used for executing a method for screen control and a method for screen display on a touch screen according to one embodiment of the present invention.

Please refer to FIG. 1. According to one embodiment of the present invention, the method for screen control and the method for screen display on a touch screen of the present invention can be implemented in an electronic device 100. The electronic device 100 comprises a touch screen 101. The touch screen 101 comprises a display area 102 used for displaying an on-screen object. The display area 102 comprises a left display boundary 103a and a right display boundary 103b opposite to it. A user can use a finger 110 or a touch pen to operate on the touch screen 101 or close to the touch screen 101, so as to form a traveling path. The electronic device 100 can utilize a processor to execute a software program, detect the user's traveling path, and further perform identification, thereby accomplishing the method for screen control and method for screen display on a touch screen of the present invention. Moreover, please note that the technique of how the touch screen 101 senses and detects the traveling path of the user's finger 110 or the touch pen is well known by those skilled in the art; therefore, there is no need for further description in this disclosure.

The electronic device 100 shown in FIG. 1 is only used as an example. For those skilled in the art, it is understood that the electronic device 100 can be a smart phone or a tablet computer, and the touch screen 101 can be a capacitive touch panel; however, the scope of the present invention is not limited to the above description. Further, please also note that the electronic device 100 can also comprise other detailed modules or components.

Figure 2:
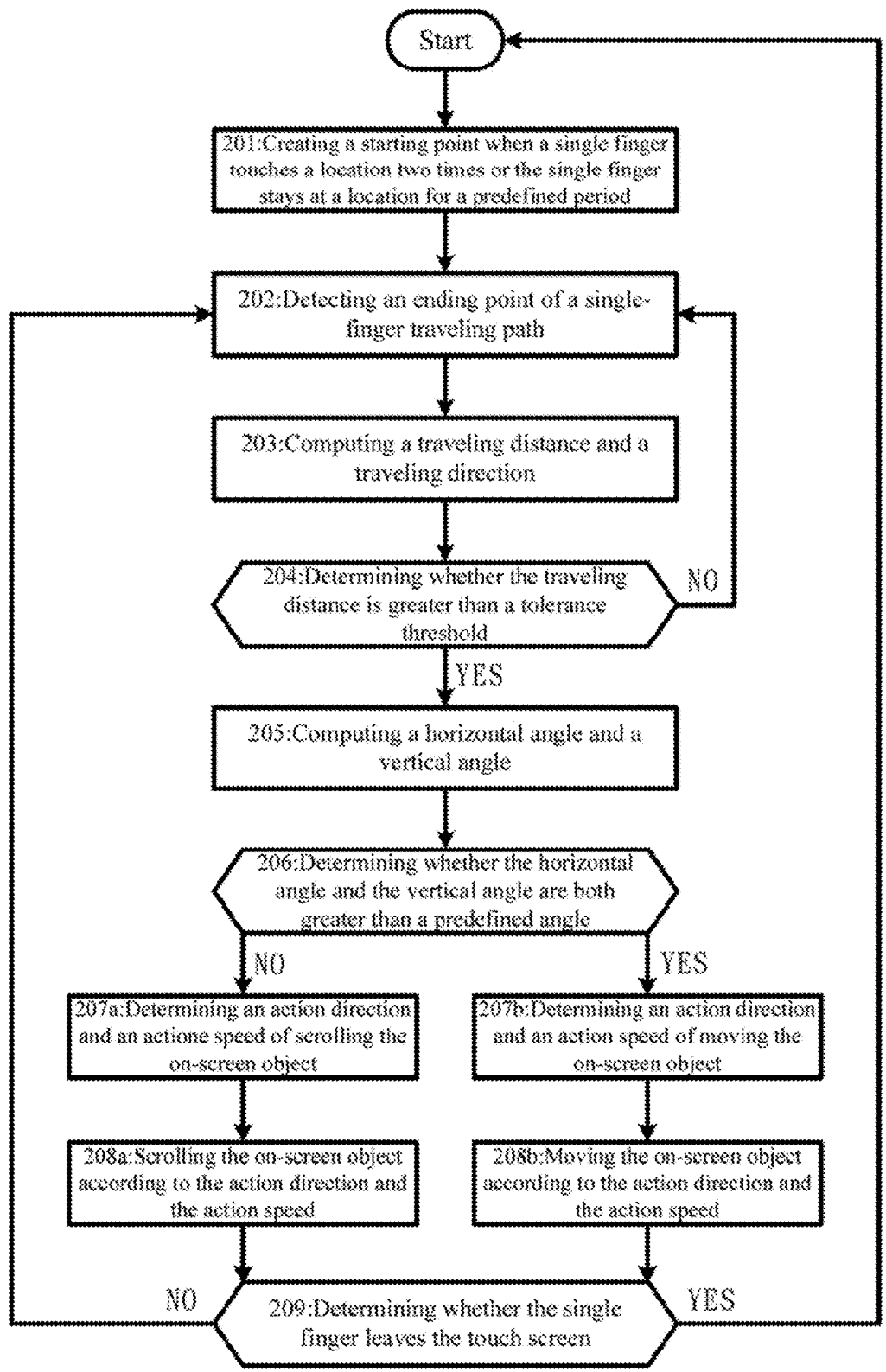
FIG. 2 illustrates a flowchart showing a method for single-finger screen control on a touch screen according to one embodiment of the present invention.
Figure 3:
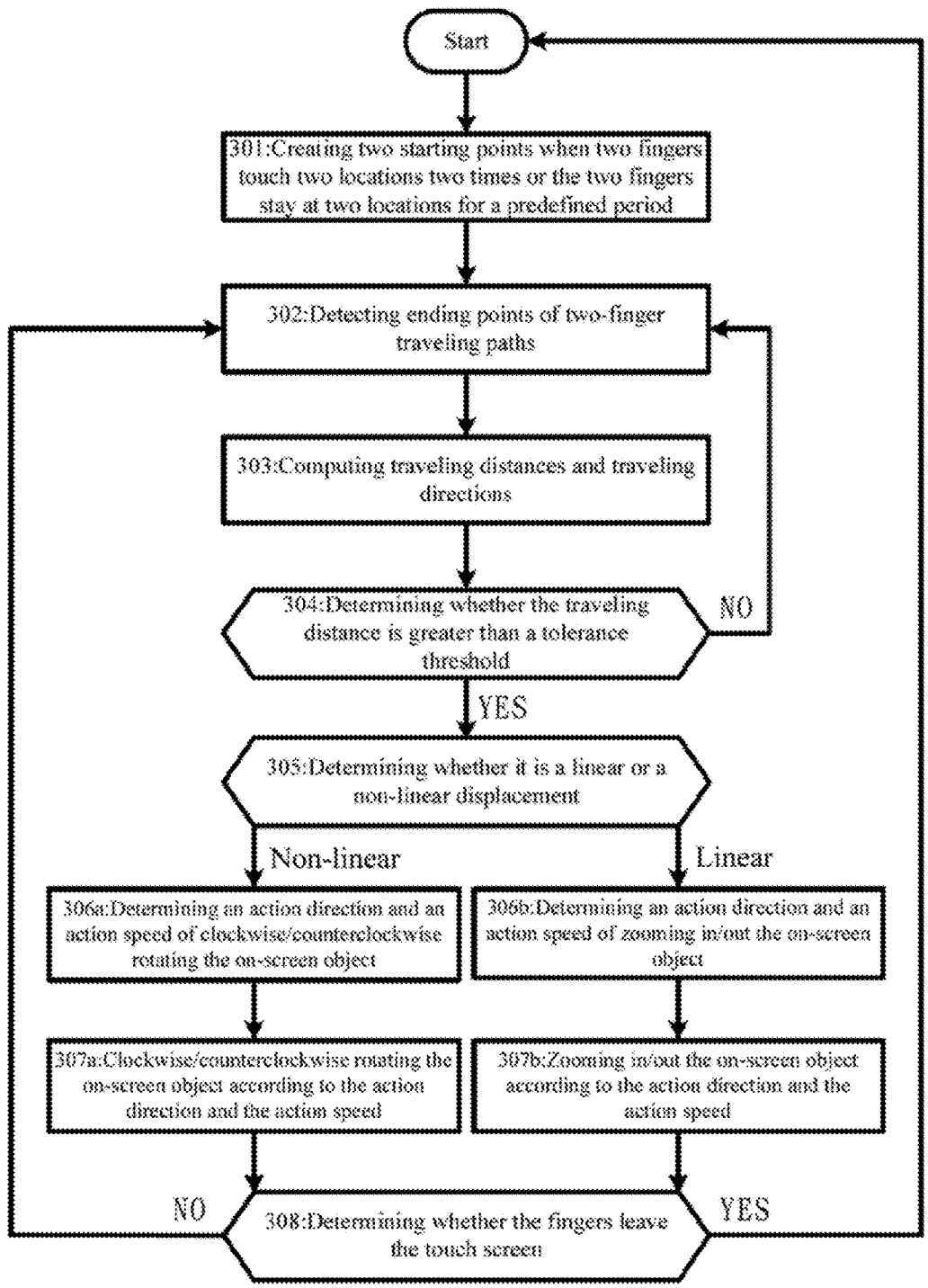
FIG. 3 illustrates a flowchart of a method for two-finger screen control on a touch screen according to one embodiment of the present invention.

Please refer to FIG. 2 and FIG. 3 related to flowcharts showing methods for screen control on a touch screen according to one embodiment of the present invention. According to one embodiment of the present invention, the method for screen control on a touch screen of the present invention comprises a single-finger screen control method and a two-finger screen control method. FIG. 2, FIG. 4 and FIG. 5 are related to the single-finger screen control method according to one embodiment of the present invention; and FIG. 3, FIG. 6 and FIG. 7 are related to the two-finger screen control method according to one embodiment of the present invention. The electronic device 100 shown in FIG. 1 is used as an example for explaining the method for screen control on a touch screen according to one embodiment of the present invention.

Firstly, please refer to FIG. 2, which illustrates a flowchart showing the method for single-finger screen control on a touch screen according to one embodiment of the present invention.

At first, the method performs step 201: creating a starting point when a single finger touches a location two times or the single finger stays at a location for a predefined period.

Figure 4A:
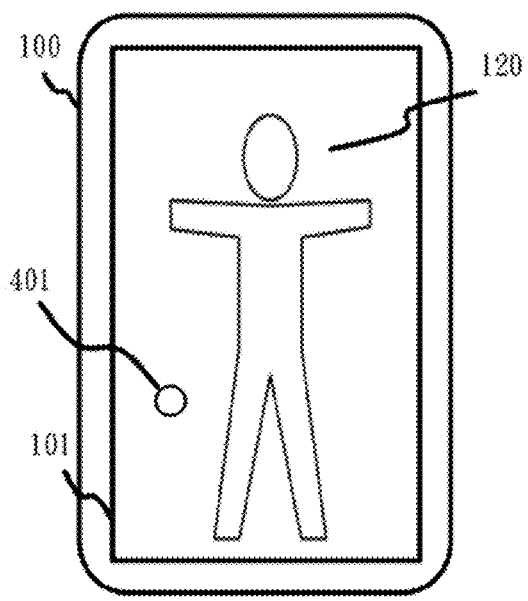
FIGS. 4(A)-4(D) illustrate schematic drawings of moving an on-screen object according to one embodiment of the method for single-finger screen control on a touch screen of the present invention.

Please refer to FIG. 4(A); the touch screen 101 displays an on-screen object 120. In one use, within a first predefined period, the user can use a single finger to touch a location of the touch screen 101 by way of clicking at least two times, or move the single finger close to a location of the touch screen 101 at least two times; and after the single finger touches or moves close to the touch screen 101 for the second time, the single finger does not move away from the touch screen 101. Or, in another use, the single finger touches or moves close to the touch screen 101 one time, and then the single finger stays at a location for a second predefined period. After the electronic device 100 detects either of the above uses, the location is set as a starting point (i.e., the coordinate of the location is set as (0,0)).

According to one embodiment of the present invention, if the electronic device 100 detects the action that the single finger touches the same location two times or stays at the same location for the predefined period, a starting symbol 401 can be displayed at a location adjacent to the starting point on the touch screen 101. Please note that the step of displaying the starting symbol at the location adjacent to the starting point is not a necessary step of the present invention. According to another embodiment of the present invention, it is also applicable that the starting symbol is not displayed on the touch screen 101.

Then the method performs step 202: detecting an ending point of a single-finger traveling path.

Figure 4B:
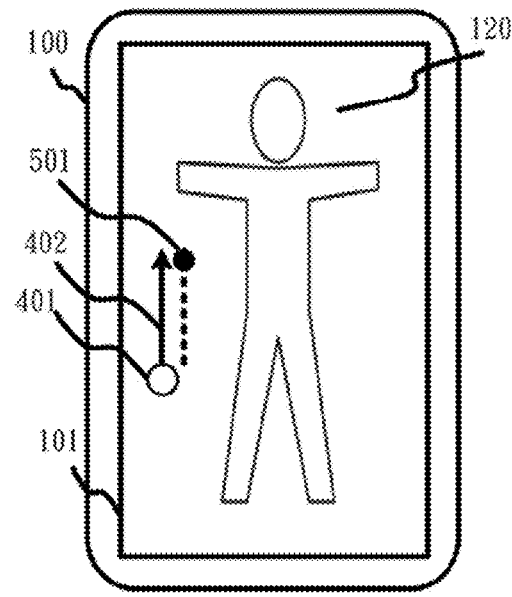
Figure 4C:
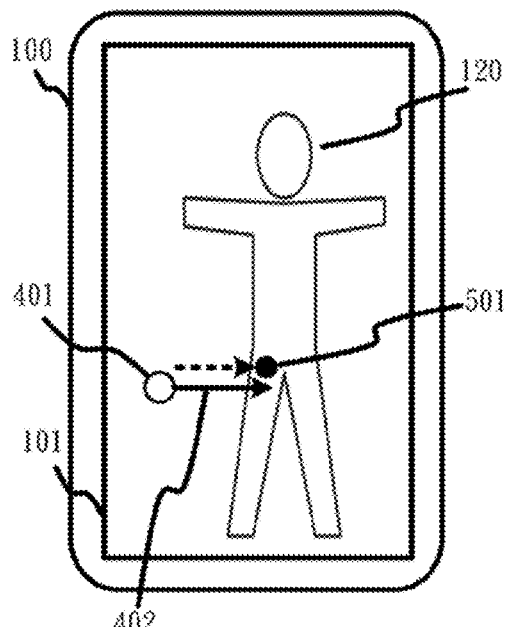
Figure 4D:
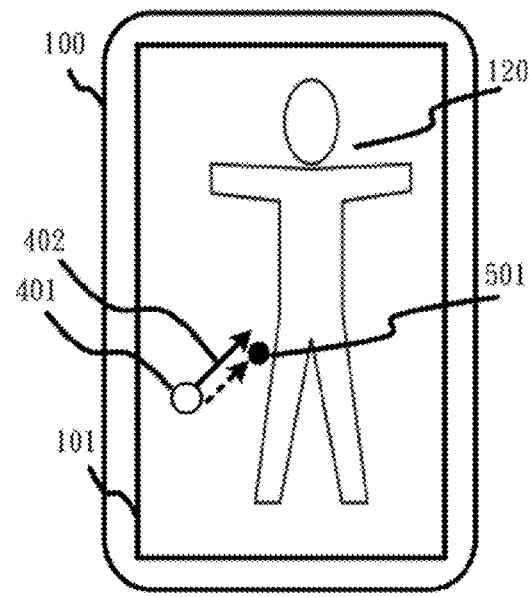

Please refer to FIG. 4(B), FIG. 4(C) and FIG. 4(D); the single-finger traveling path is shown as dotted lines in the figures. After the user creates the starting point, the single finger does not move away from the touch screen 101 but keeps moving by touching or being close to the touch screen 101, and finally stops at an ending point 501. In FIG. 4(B), the user's single-finger traveling path moves up and stops at a coordinate of (0,2). In FIG. 4(C), the user's single-finger traveling path moves to the right and stops at a coordinate of (1,0). In FIG. 4(D), the user's single-finger traveling path moves in an upper-right direction and stops at a coordinate of (1,1).

Then the method performs step 203: computing a traveling distance and a traveling direction.

After obtaining the starting point and the ending point in the process of detecting the traveling path, the present invention then computes a traveling distance and a traveling direction of the traveling path according to the starting point and the ending point. The traveling distance is a linear distance between the starting point and the ending point, and the traveling direction is a direction which moves straight from the starting point to the ending point. In FIG. 4(A), the starting point is defined as the origin (0,0). In FIG. 4(B), the detected ending point 501 is at the coordinate (0,2); therefore, the traveling distance of the user's single-finger traveling path in FIG. 4(B) is 2 units long, and the traveling direction is in the positive Y-axis direction. In FIG. 4(C), the detected ending point 501 is at the coordinate (1,0); therefore, the traveling distance of the user's single-finger traveling path in FIG. 4(C) is 1 unit long, and the traveling direction is in the positive X-axis direction. In FIG. 4(D), the detected ending point 501 is at the coordinate (1,1); therefore, the traveling distance of the user's single-finger traveling path in FIG. 4(D) is about 1.414 units long, and the traveling direction is in a 45-degree angle direction between the positive X-axis and the positive Y-axis.

Then the method performs step 204: determining whether the traveling distance is greater than a tolerance threshold.

After computing the traveling distance, the method then determines whether the traveling distance is greater than an tolerance threshold. According to one embodiment of the present invention, the tolerance threshold is, but is not limited to, 0.2 units long. If the traveling distance is not greater than the tolerance threshold, the method returns to step 202 for detecting the ending point of the traveling path once again. Otherwise, if the traveling distance is greater than the tolerance threshold, the method performs step 205.

The purpose of step 204 is to confirm that the user's traveling path is an effective action so as to compensate for the condition that the user accidentally touches the touch screen 101. The length of the tolerance threshold can be determined according to factors such as the size of the touch screen 101. The electronic device 100 may have a default value which the user is able to adjust. Please note that step 204 is not a necessary step of the present invention. According to another embodiment of the present invention, the following steps can be directly performed without determining whether the traveling distance is greater than the tolerance threshold. In this embodiment, because the traveling distances in FIG. 4(B), FIG. 4(C) and FIG. 4(D) are all greater than the tolerance threshold, the method then moves on to step 205.

In the condition that the traveling distance is greater than the tolerance threshold, the method performs step 205: computing a horizontal angle and a vertical angle.

After confirming the traveling distance is greater than the tolerance threshold, the electronic device 100 computes a horizontal angle between the traveling direction and a horizontal axis, and computes a vertical angle between the traveling direction and a vertical axis. According to one embodiment of the present invention, the horizontal axis is a straight line parallel to an upper display boundary 104a and a lower display boundary 104b of the touch screen 101; and the vertical axis is a straight line parallel to the left display boundary 103a and the right display boundary 103b of the touch screen 101.

Then the method performs step 206: determining whether the horizontal angle and the vertical angle are both greater than a predefined angle.

After computing the horizontal angle and the vertical angle, the electronic device 100 determines whether the horizontal angle and the vertical angle are both greater than a predefined angle (according to one embodiment of the present invention, without limiting the scope of the present invention, the predefined angle is 15 degrees). If the horizontal angle and the vertical angle are both greater than the predefined angle, the method then performs step 207b; otherwise, the method performs step 207a.

The purpose of step 206 is to identify whether the user wants to perform an action of horizontally/vertically scrolling the on-screen object 120, or an action of moving the on-screen object 120 in a non-horizontal/vertical direction. If the horizontal angle and the vertical angle are both greater than the predefined angle, the method determines the user wants to move the on-screen object 120 in the non-horizontal/vertical direction. In contrast, if the horizontal angle is not greater than the predefined angle, the method determines the user actually wants to horizontally scroll the on-screen object 120, and the slight horizontal angle is just a small error generated when the finger performs horizontal movement; if the vertical angle is not greater than the predefined angle, the method determines the user actually wants to vertically scroll the on-screen object 120, and the slight vertical angle is just a small error generated when the finger performs vertical movement.

In this embodiment, the user's traveling path in FIG. 4(B) has its vertical angle (0 degree) smaller than the predefined angle (15 degrees), so the method determines that the user wants to vertically scroll the on-screen object 120; the user's traveling path in FIG. 4(C) has its horizontal angle (0 degree) smaller than the predefined angle (15 degrees), so the method determines that the user wants to horizontally scroll the on-screen object 120; and the user's traveling path in FIG. 4(D) has both its vertical angle (45 degrees) and horizontal angle (45 degrees) larger than the predefined angle (15 degrees), so the method determines that the user wants to move the on-screen object 120 in the upper-right direction.

The predefined angle can be determined according to factors such as user experiences. The electronic device 100 may have a default value which the user is able to adjust. Please note that steps 205 and 206 are not necessary steps of the present invention. According to another embodiment of the present invention, these two steps can be skipped by neither computing the horizontal angle and the vertical angle, nor determining whether the horizontal angle and the vertical angle are both greater than the predefined angle. The present invention can directly perform step 207a or 207b right after step 204.

If one of the horizontal angle and the vertical angle is smaller than the predefined angle, the method performs steps 207a-208a: determining an action direction and an action speed of scrolling the on-screen object; and scrolling the on-screen object according to the action direction and the action speed.

As shown in FIG. 4(B), the vertical angle is smaller than the predefined angle; therefore, the action direction is determined as the positive Y-axis direction, and the on-screen object 120 will be vertically scrolled up. As shown in FIG. 4(C), the horizontal angle is smaller than the predefined angle; therefore, the action direction is determined as the positive X-axis direction, and the on-screen object 120 will be horizontally scrolled to the right. The action speed of scrolling is proportional to the traveling distance.

If the horizontal angle and the vertical angle are both greater than the predefined angle, the method performs steps 207b-208b: determining an action direction and an action speed of moving the on-screen object; and moving the on-screen object according to the action direction and the action speed.

As shown in FIG. 4(D), the angle between the traveling direction and the positive X-axis and the angle between the traveling direction and the positive Y-axis are both 45 degrees; therefore, the method determines that the action direction is parallel to the user's traveling path, and the on-screen object 120 will be moved in the upper-right direction in a 45-degree angle. The action speed of moving is proportional to the traveling distance.

Next, the method performs step 209: determining whether the single finger leaves the touch screen.

After the on-screen object 120 is moved, the electronic device 100 determines whether the user's finger has left the touch screen 101. In response to an affirmative determination, the method for single-finger screen control on a touch screen ends; otherwise, the method returns to step 202 for detecting the ending point of the traveling path once again.

According to one embodiment of the present invention, the electronic device 100 can display an arrow symbol 402 on the touch screen 101, wherein the arrow symbol 402 extends from the starting symbol 401 in the previously-determined action direction, and the length of the arrow symbol 402 is proportional to the previously-determined action speed. Please note that the step of displaying the arrow symbol 402 is not a necessary step of the present invention. In another embodiment of the present invention, it is also applicable for not displaying the arrow symbol on the touch screen 101.

According to one embodiment of the present invention, if the user wants to change the action speed of moving the on-screen object 120, the user can move the finger from the ending point of the traveling path to a new ending point. The electronic device 100 will periodically detect the ending point of the traveling path to obtain the new ending point. If the new ending point is different from the original ending point, the method computes a new traveling distance and a new traveling direction of the traveling path according to the original starting point and the new ending point. Further, according to the new traveling distance and the new traveling direction, the method determines a new action direction and a new action speed, wherein the new action speed is proportional to the new traveling distance, and the new action direction is parallel to the new traveling direction. Finally, the method moves the on-screen object 120 according to the new action direction and the new action speed.

Figure 5A:
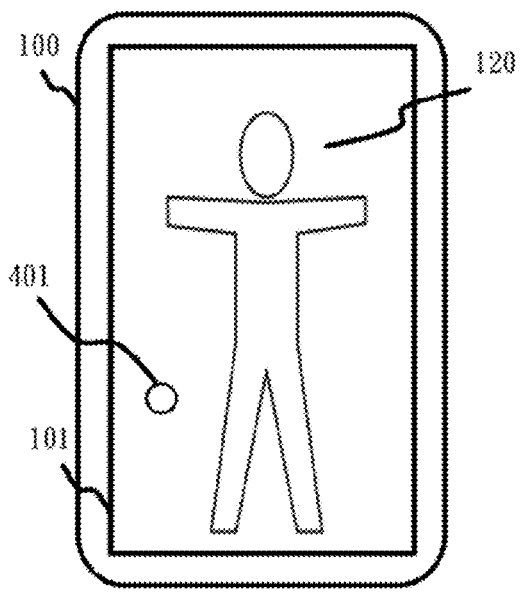
FIGS. 5(A)-5(D) illustrate schematic drawings of moving the on-screen object once again according to one embodiment of the method for single-finger screen control on a touch screen of the present invention.
Figure 5B:
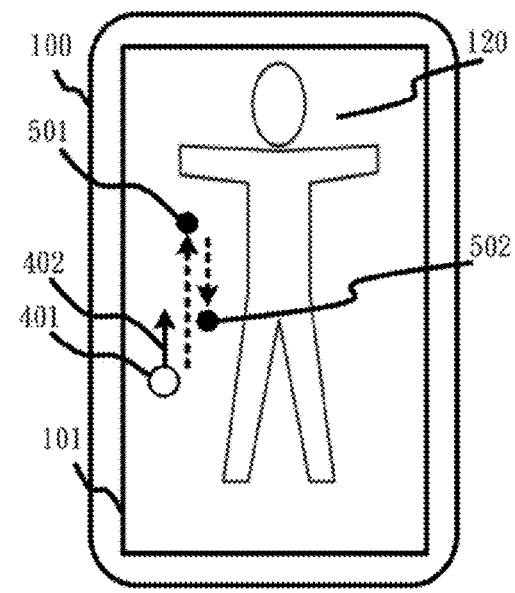
Figure 5C:
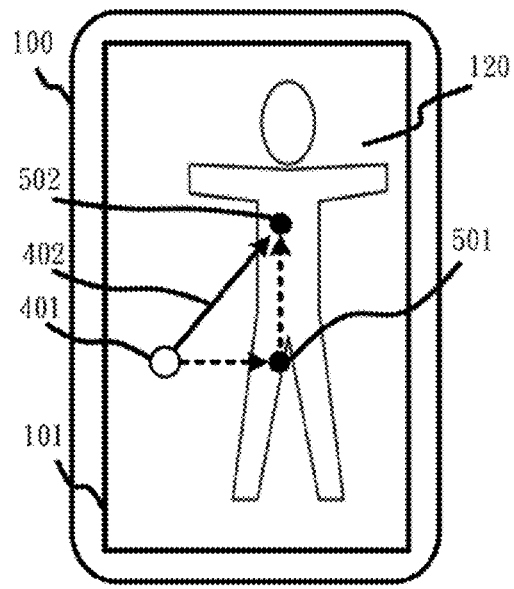
Figure 5D:
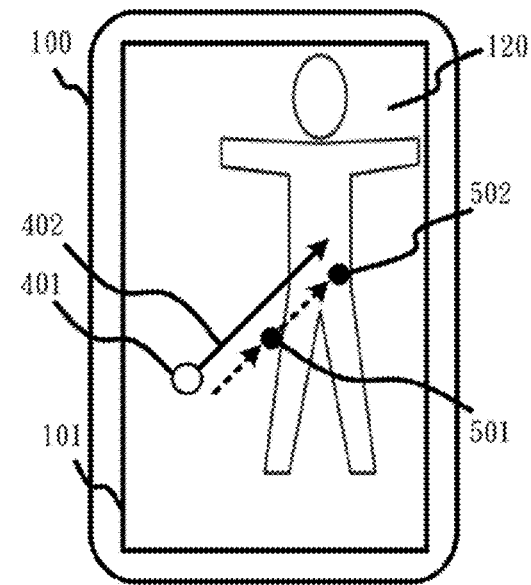

Please refer to FIGS. 5(A)-5(D), each of which respectively shows the user's traveling path moves to the new ending point 502. In FIG. 5(B), the user's traveling path firstly stays at the ending point 501 at the coordinate (0,2) as shown in FIG. 4(B), and then moves down to the new ending point 502 at the coordinate (0,1); therefore, the new traveling distance of the user's single-finger traveling path in FIG. 5(B) is reduced to 1 unit long, and the new traveling direction is still in the positive Y-axis direction. In FIG. 5(C), the user's traveling path firstly stays at the ending point 501 at the coordinate (1,0) as shown in FIG. 4(C), and then moves up to the new ending point 502 at the coordinate (1,1); therefore, the new traveling distance of the user's single-finger traveling path in FIG. 5(C) is increased to about 1.414 units long, and the new traveling direction is changed from the positive X-axis direction to the 45-degree angle direction between the positive X-axis and the positive Y-axis. In FIG. 5(D), the user's traveling path firstly stays at the ending point 501 at the coordinate (1,1) as shown in FIG. 4(D), and then moves in the upper-right direction to the new ending point 502 at the coordinate (2,2); therefore, the new traveling distance of the user's single-finger traveling path in FIG. 5(D) is increased to about 2.828 units long, and the new traveling direction is still in the 45-degree angle direction between the positive X-axis and the positive Y-axis.

After completing error determination (step 204), horizontal angle and vertical angle computation (step 205), and predefined angle comparison (step 206), the method determines the new action direction and the new action speed according to the new traveling distance and the new traveling direction, and then moves the on-screen object 120 according to the new action direction and the new action speed. As shown in FIG. 5(B), because the vertical angle of the new traveling direction is smaller than the predefined angle, the new action direction is still determined as the positive Y-axis direction, and therefore the on-screen object 120 will still be scrolled up; however, the new action speed of scrolling-up is half of the previous action speed. As shown in FIG. 5(C), because the angle between the new traveling direction and the positive X-axis and the angle between the new traveling direction and the positive Y-axis are both 45 degrees, the new action direction is determined as the upper-right direction in a 45-degree angle, and the new action speed is about 1.414 times the previous action speed. As shown in FIG. 5(D), because the angle between the new traveling direction and the positive X-axis and the angle between the new moving and the positive Y-axis are both still 45 degrees, the new action direction is determined as being parallel to the traveling direction of the user's traveling path, and therefore the on-screen object 120 is still moved in the upper-right direction in a 45-degree angle, and the new action speed is twice the previous action speed.

According to one embodiment of the present invention, if the new ending point is different from the original ending point, the method can update the display of the arrow symbol 402, wherein the arrow symbol 402 extends from the starting symbol 401 in the new action direction, and the length of the arrow symbol 402 is proportional to the new action speed. Please note that the step of displaying the arrow symbol is not a necessary step of the present invention. According to another embodiment of the present invention, it is also applicable not to display the arrow symbol on the touch screen 101.

According to one embodiment of the present invention, if the user uses two fingers to control the on-screen object, the method for two-finger screen control on a touch screen of the present invention will be triggered accordingly. Please refer to FIG. 3, FIG. 6 and FIG. 7 related to one preferred embodiment of the two-finger screen control method according to the present invention.

At first, the method performs step 301: creating two starting points when two fingers touch two locations two times or the two fingers stay at two locations for a predefined period.

Figure 6A:
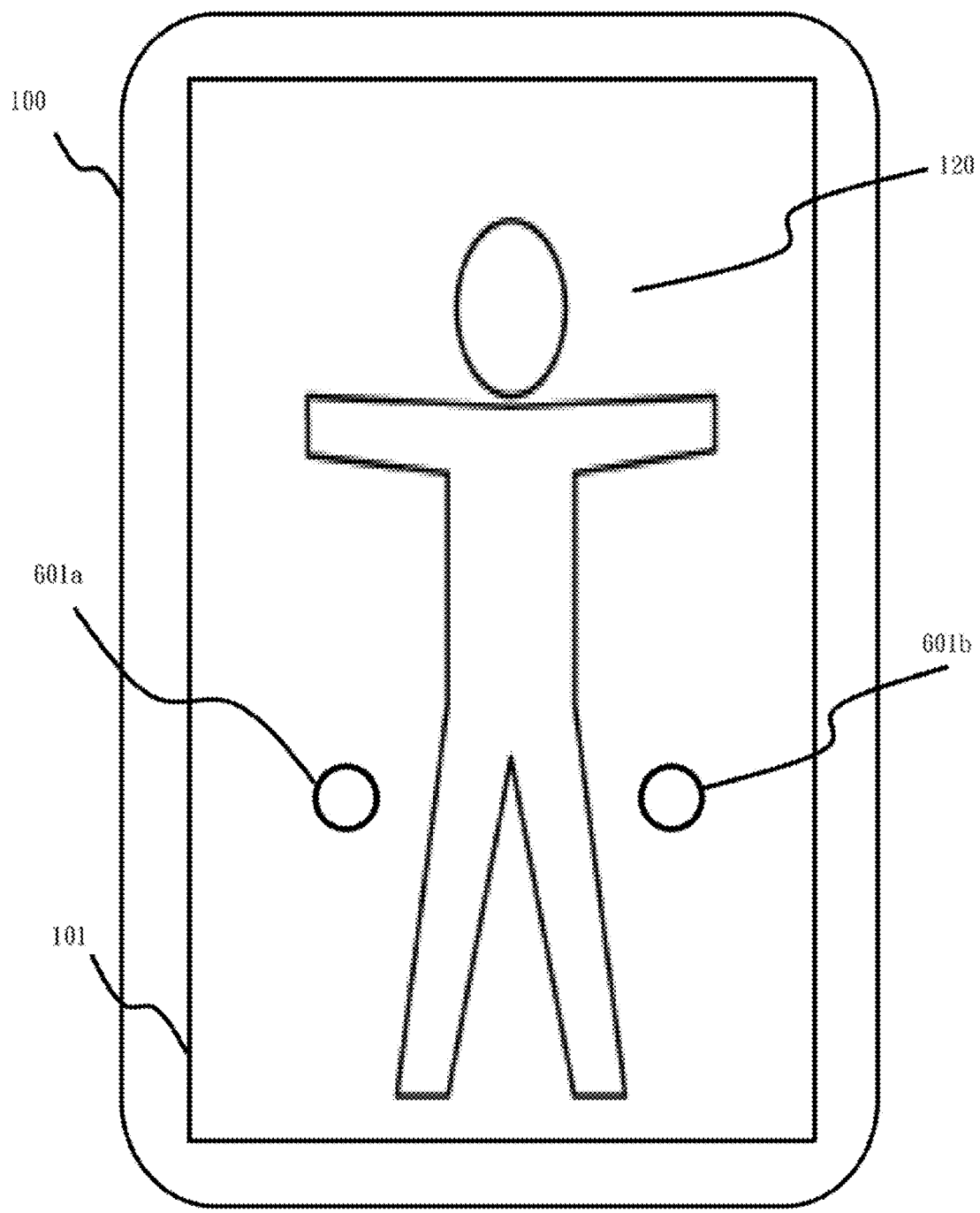
FIGS. 6(A)-6(E) illustrate schematic drawings of moving the on-screen object according to one embodiment of the method for two-finger screen control on a touch screen of the present invention.

Please refer to FIG. 6(A); the touch screen 101 displays an on-screen object 120. In one use, within a first predefined period, the user can use two fingers to respectively touch two locations (601a, 601b) of the touch screen 101 by way of clicking at least two times, or move the two fingers close to two locations of the touch screen 101 at least two times; and after the two fingers touch or move close to the touch screen 101 for the last time, the two fingers do not move away from the touch screen 101. Or, in another use, after the two fingers respectively touch or move close to the two locations (601a, 601b) of the touch screen 101, the two fingers stay at the two locations (601a, 601b) for a second predefined period. After the electronic device 100 detects either of the above uses, the two locations will be set as starting points (i.e., the coordinates of the locations are set as (0,0) and (2,0)).

According to one embodiment of the present invention, if the electronic device 100 detects the action that the two fingers touch twice, two starting symbols (601a, 601b) can be displayed at locations adjacent to the two starting points on the touch screen 101 so as to respectively mark the starting points of the two fingers. Please note that the step of displaying the starting symbol at the location adjacent to the starting point is not a necessary step of the present invention. According to another embodiment of the present invention, it is also applicable not to display the starting symbol on the touch screen 101. Further, according to another embodiment of the present invention, the action that the user creates the starting points is not limited to touching or being close to the same location of the touch screen at least two times.

Next, the method performs step 302: detecting ending points of two-finger traveling paths.

Figure 6B:
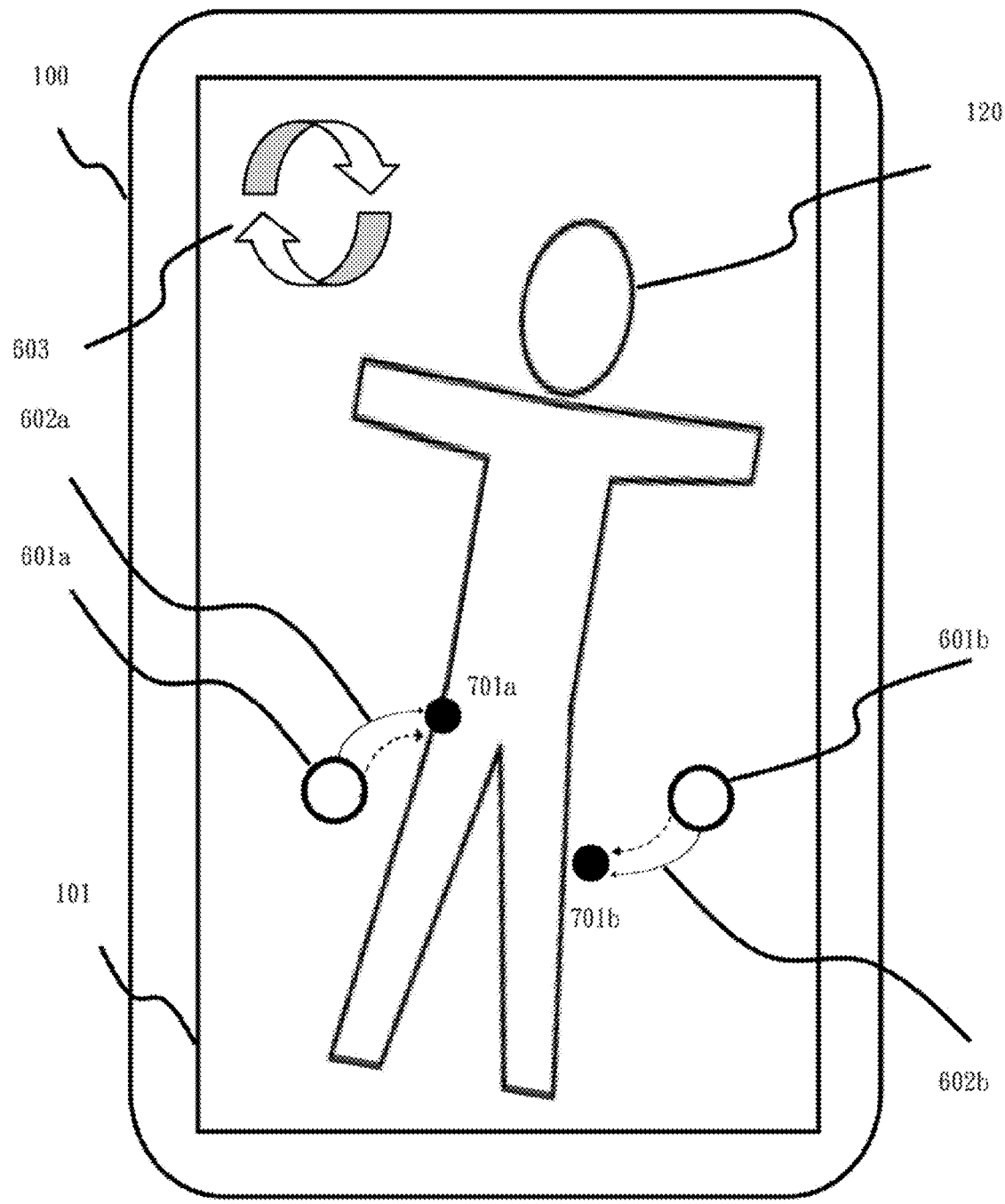
Figure 6C:
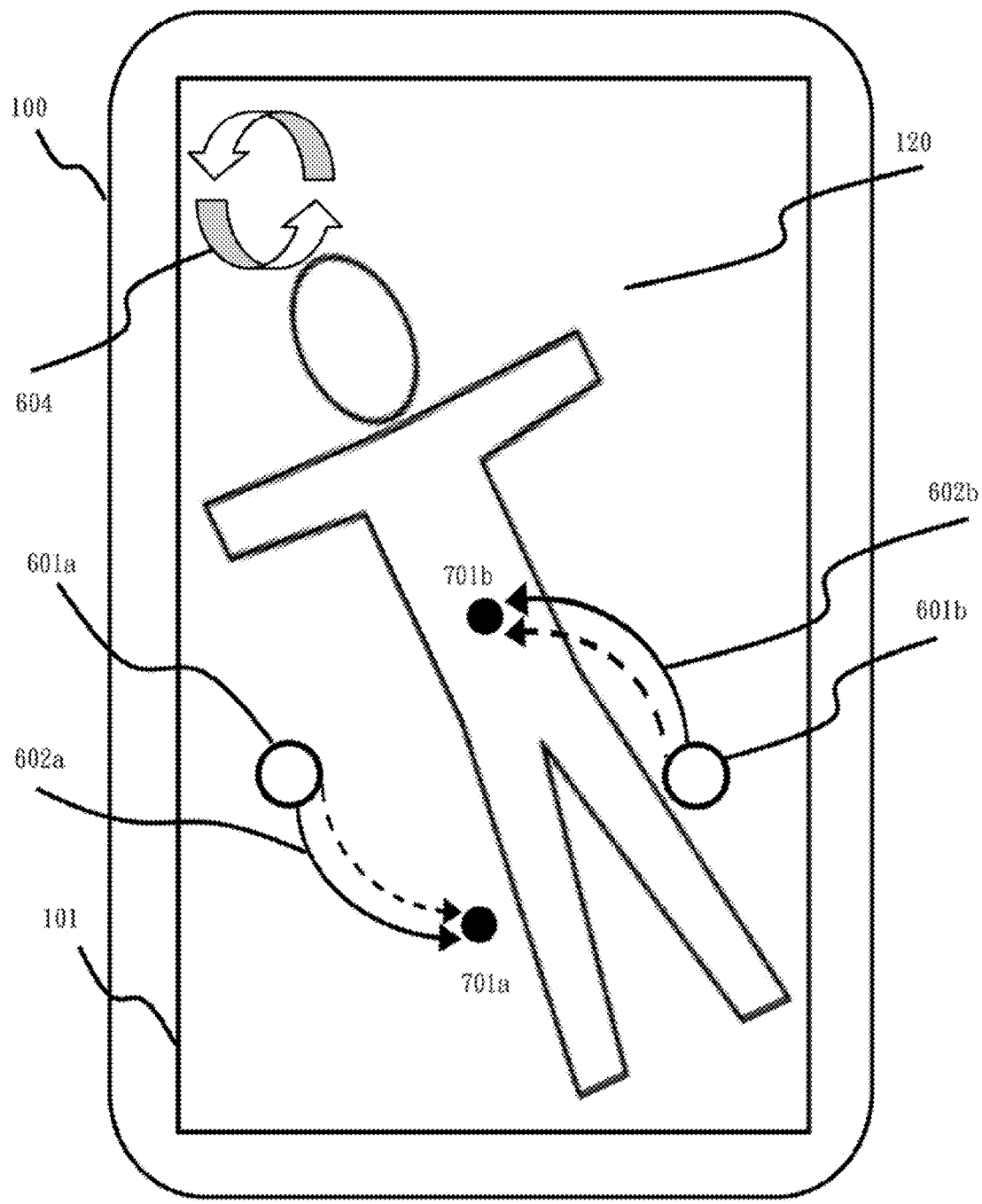
Figure 6D:
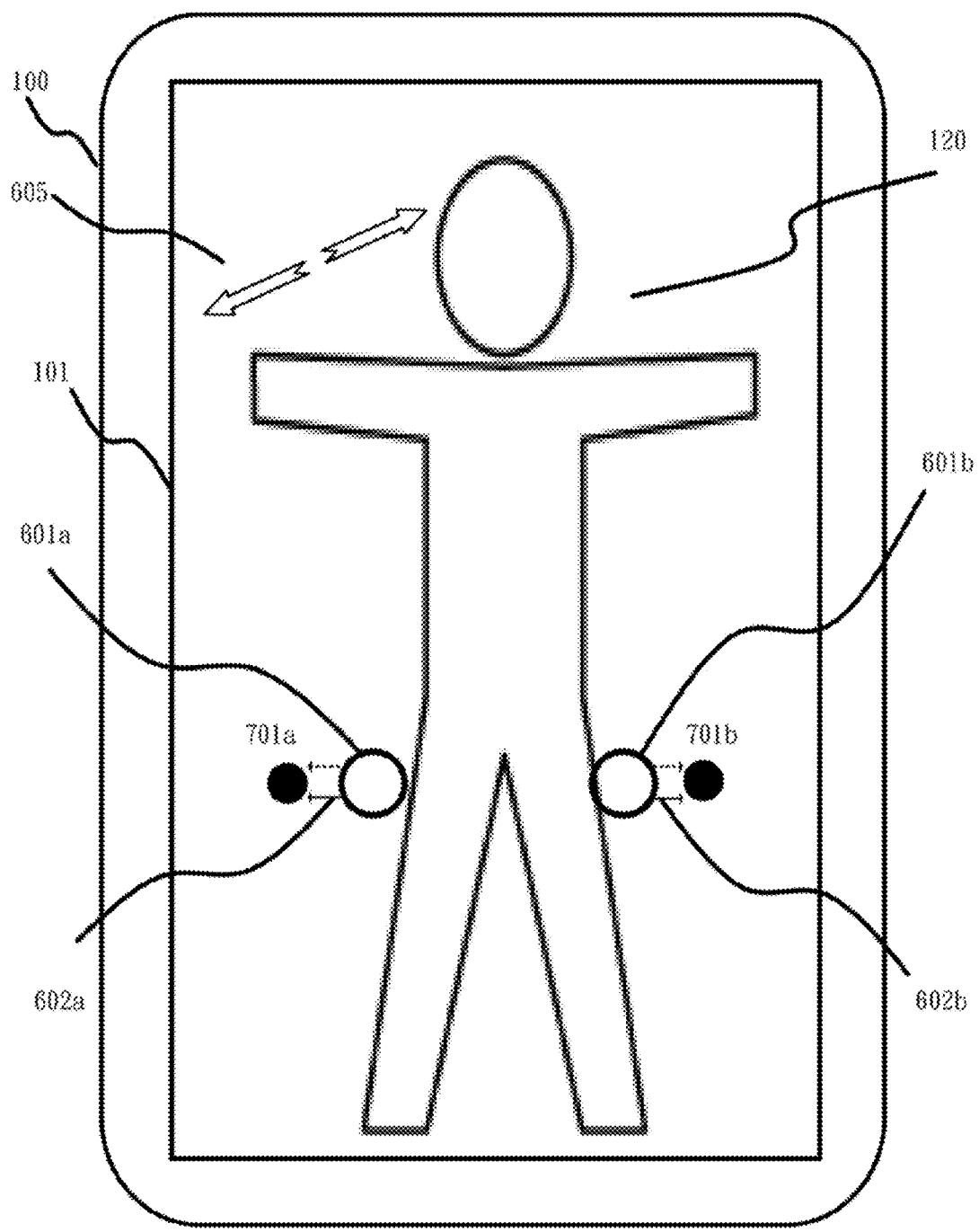
Figure 6E:
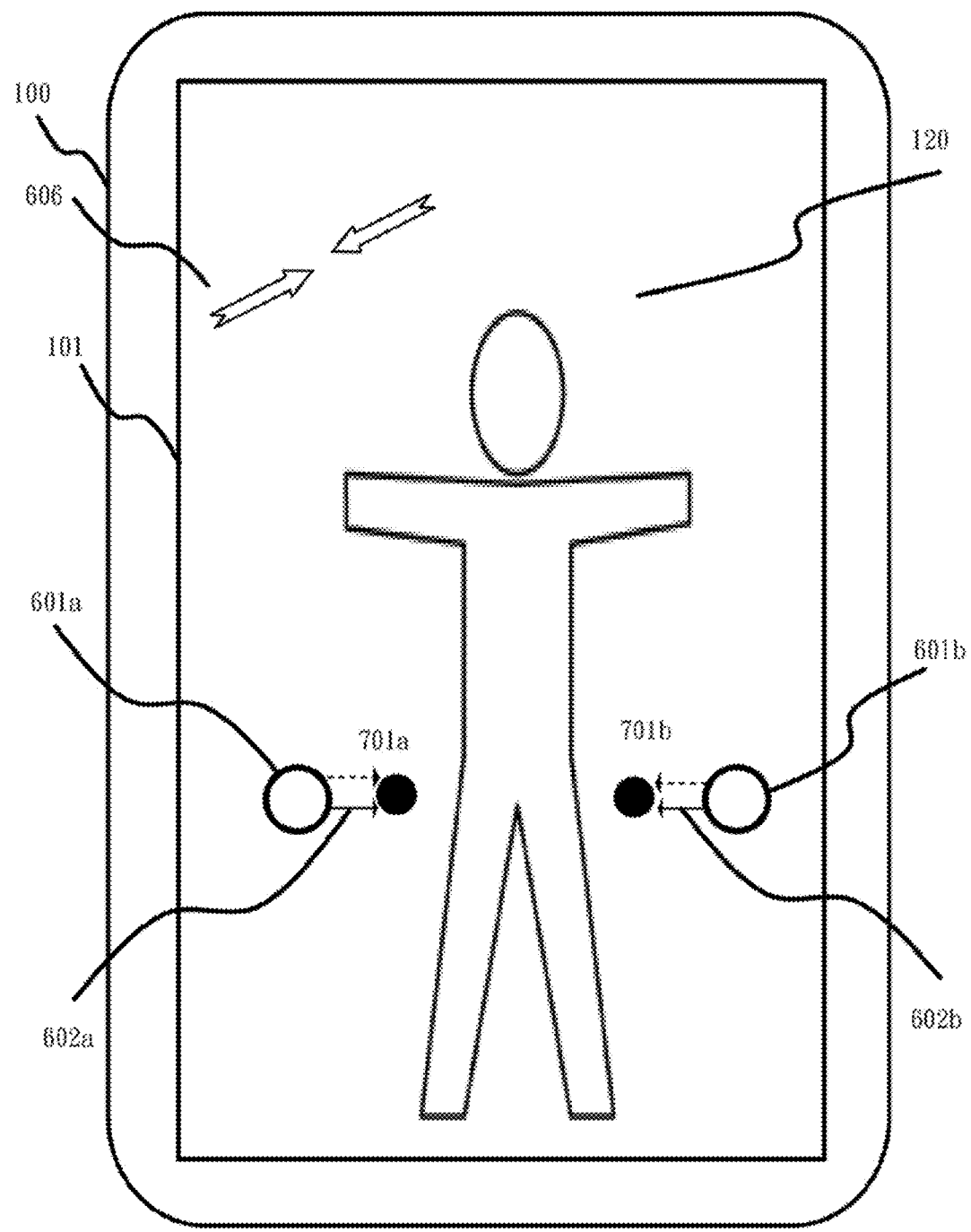

Please refer to FIGS. 6(B)-6(E); the two-finger traveling paths are shown as dotted lines in the figures. After the user creates the starting points, the two fingers do not move away from the touch screen 101 but keep moving by touching or being close to the touch screen 101, and finally the two fingers respectively stop at the ending points 701a and 701b. In FIG. 6(B), the user's two-finger traveling paths rotate in a clockwise direction, and the two fingers respectively stop at coordinates of (0.5,0.5) and (1.5,−0.5). In FIG. 6(C), the user's two-finger traveling paths rotate in a counterclockwise direction, and the two fingers respectively stop at coordinates of (1,−1) and (1,1). In FIG. 6(D), the user's two-finger traveling paths move outwardly, and the two fingers respectively stop at coordinates of (−0.5,0) and (2.5,0). In FIG. 6(E), the user's two-finger traveling paths move inwardly, and the two fingers respectively stop at coordinates of (0.25,0) and (1.75,0).

According to one embodiment of the present invention, after detecting the ending points, the electronic device 100 can respectively display arrow symbols 602a and 602b between the starting symbols (601a, 601b) and the ending points (701a, 701b) on the touch screen 101, and the arrow symbols 602a and 602b can extend from the starting symbols (601a, 601b) to the ending points (701a, 701b). Please note that the step of displaying the arrow symbols is not a necessary step of the present invention. According to another embodiment of the present invention, it is also applicable not to display the arrow symbols on the touch screen 101.

Then the method performs step 303: computing traveling distances and traveling directions.

After obtaining the two starting points and the two ending points in the process of detecting the traveling paths, the present invention then performs average or weighted computation to obtain the traveling distances and traveling directions representing the two traveling paths according to the two starting points and the two ending points. The traveling distance is a linear distance between the starting point and the ending point, and the traveling direction is a direction which moves straight from the starting point to the ending point. In this embodiment, the user in FIG. 6(B) has two traveling paths with both traveling distances 0.707 units long; the user in FIG. 6(C) has two traveling paths with both traveling distances 1.414 units long; the user in FIG. 6(D) has two traveling paths with both traveling distances 0.5 units long; and FIG. 6(E) has two traveling paths with both traveling distances 0.25 units long.

Then the method performs step 304: determining whether the traveling distance is greater than a tolerance threshold.

After computing the traveling distances, the method then determines whether the traveling distance is greater than a tolerance threshold. According to one embodiment of the present invention, the tolerance threshold is, but is not limited to, 0.2 units long. If the traveling distance is not greater than the tolerance threshold, the method returns to step 302 for detecting the ending points of the traveling paths once again. Otherwise, if the traveling distance is greater than the tolerance threshold, the method performs step 305. Please note that step 304 is not a necessary step of the present invention. According to another embodiment of the present invention, the following steps can be directly performed without determining whether the traveling distance is greater than the tolerance threshold. In this embodiment, because the traveling distances in FIGS. 6(B)-6(E) are all greater than the tolerance threshold, the method then moves on to step 305.

In the condition that the traveling distance is greater than the tolerance threshold, the method performs step 305: determining whether it is a linear or a non-linear displacement.

After confirming that the traveling distance is greater than the tolerance threshold, according to two vectors formed by the two starting points and the two ending points, the electronic device 100 determines whether the two vectors are substantially located on the same straight line. In response to an affirmative determination, the method performs an action of zooming in or out the on-screen object 120; otherwise, the method determines whether the two vectors substantially move in either a clockwise direction or a counterclockwise direction. If the two vectors move in the clockwise direction, the method performs an action of rotating the on-screen object 120 in the clockwise direction. If the two vectors move in the counterclockwise direction, the method performs an action of rotating the on-screen object 120 in the counterclockwise direction.

In this embodiment, the two vectors in FIG. 6(B) and FIG. 6(C) perform the non-linear displacement; therefore, the method will perform the action of rotating in either the clockwise or the counterclockwise direction; and the two vectors in FIG. 6(D) and FIG. 6(E) perform the linear displacement; therefore, the method will perform the action of zooming in or out.

Then the method performs step 306a or 306b: determining an action direction and an action speed of clockwise/counterclockwise rotating the on-screen object, or determining an action direction and an action speed of zooming in/out the on-screen object.

The electronic device 100 determines the action direction and the action speed of the on-screen object 120 according to the traveling distance and the traveling direction. According to one embodiment of the present invention, the action speed is proportional to the traveling distance.

Next, the method performs step 307a or 307b: clockwise/counterclockwise rotating the on-screen object according to the action direction and the action speed, or zooming in/out the on-screen object according to the action direction and the action speed.

After determining the action direction and the action speed, the method then clockwise/counterclockwise rotates or zooms in/out the on-screen object 120 according to the action direction and the action speed. As shown in FIG. 6(B), the on-screen object 120 is rotated in the clockwise direction; as shown in FIG. 6(C), the on-screen object 120 is rotated in the counterclockwise direction; as shown in FIG. 6(D), the on-screen object 120 is zoomed in; and as shown in FIG. 6(E), the on-screen object 120 is zoomed out.

According to one embodiment of the present invention, as shown in FIG. 6(B), if the method performs the action of rotating the on-screen object 120 in the clockwise direction, a clockwise symbol 603 is displayed; as shown in FIG. 6(C), if the method performs the action of rotating the on-screen object 120 in the counterclockwise direction, a counterclockwise symbol 604 is displayed; as shown in FIG. 6(D), if the method performs the action of zooming in the on-screen object 120, a zoom-in symbol 605 is displayed; and as shown in FIG. 6(E), if the method performs the action of zooming out the on-screen object 120, a zoom-out symbol 606 is displayed. Please note that the step of displaying the clockwise/counterclockwise symbol or the zoom in/out symbol is not a necessary step of the present invention.

Then the method performs step 308: determining whether the fingers leave the touch screen.

After the on-screen object 120 is moved, the electronic device 10 determines whether the user's fingers have left the touch screen 101. In response to an affirmative determination, the method for two-finger screen control on a touch screen ends; otherwise, the method returns to step 302 for detecting the ending points of the traveling paths once again.

According to one embodiment of the present invention, if the user wants to rotate/zoom-in/zoom-out the on-screen object 120 again, the user has to move the fingers from the two ending points of the two traveling paths to two new ending points. The electronic device 100 will periodically detect the ending points of the traveling paths to obtain the new ending points. If the new ending points are different from the original ending points, the method computes new traveling distances and new traveling directions of the traveling paths according to the original starting points and the new ending points. Further, according to the new traveling distances and the new traveling directions, the method determines a new action direction and a new action speed. Finally, the method moves the on-screen object 120 according to the new action direction and the new action speed.

Figure 7A:
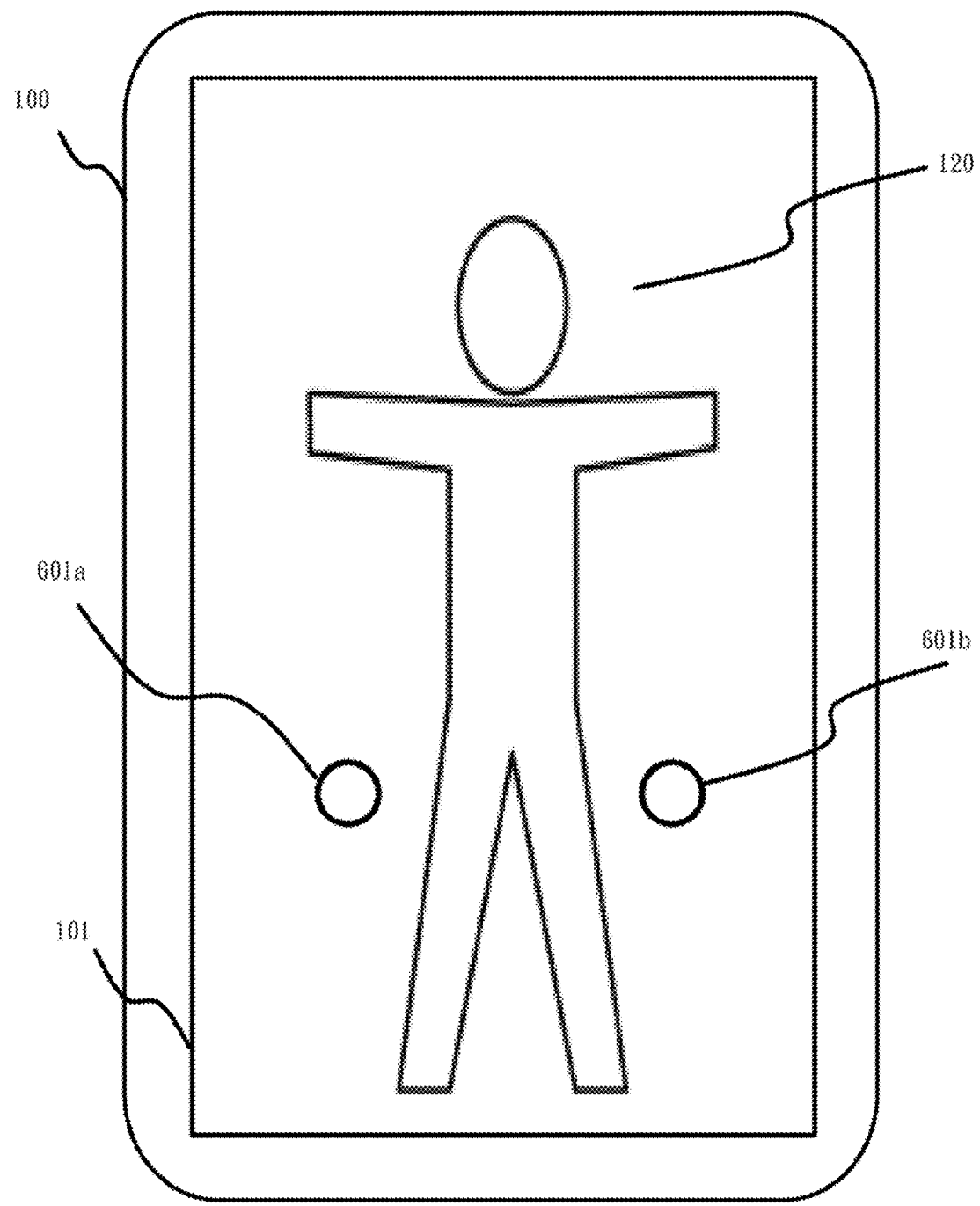
FIGS. 7(A)-7(E) illustrate schematic drawings of moving the on-screen object once again according to one embodiment of the method for two-finger screen control on a touch screen of the present invention.
Figure 7B:
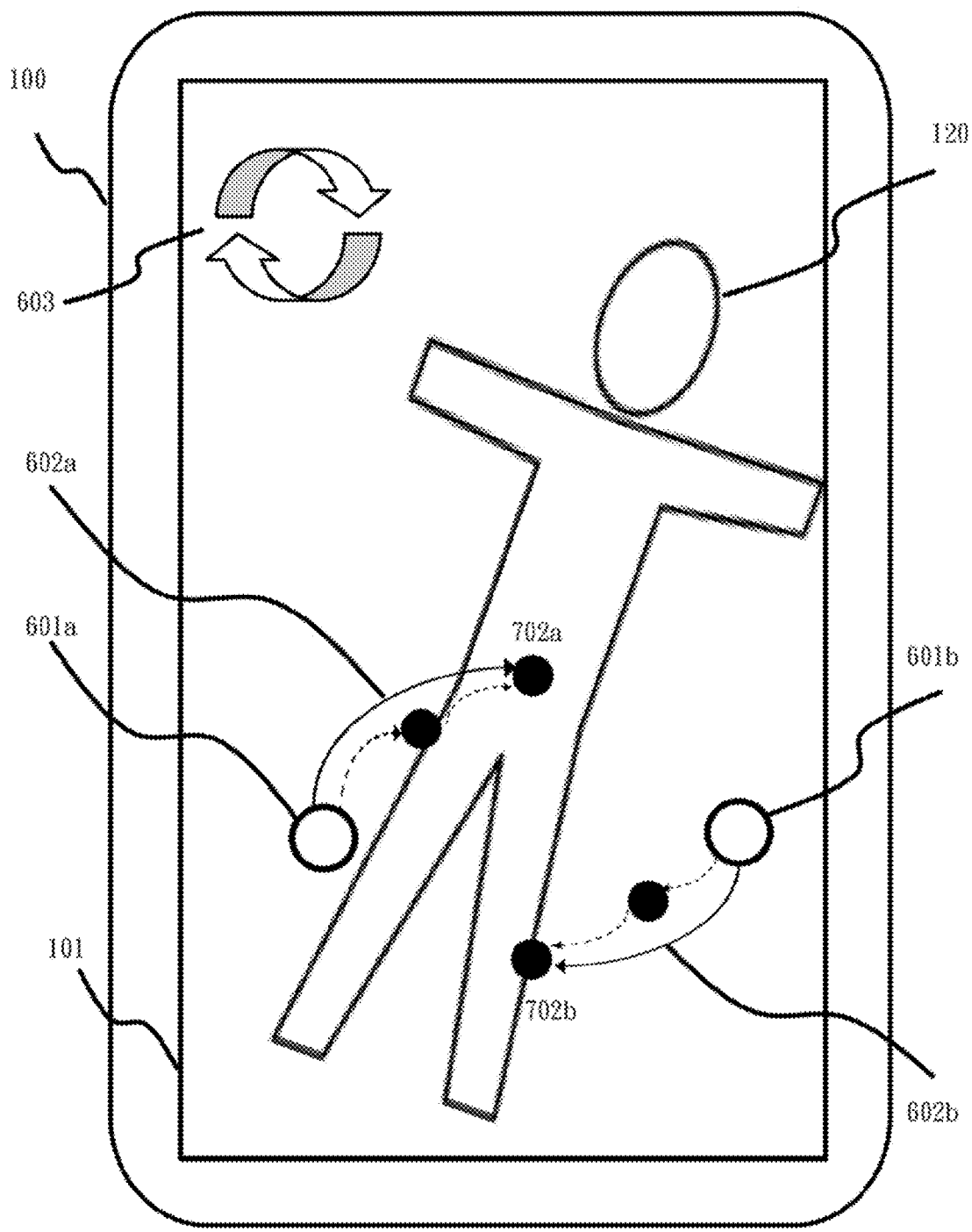
Figure 7C:
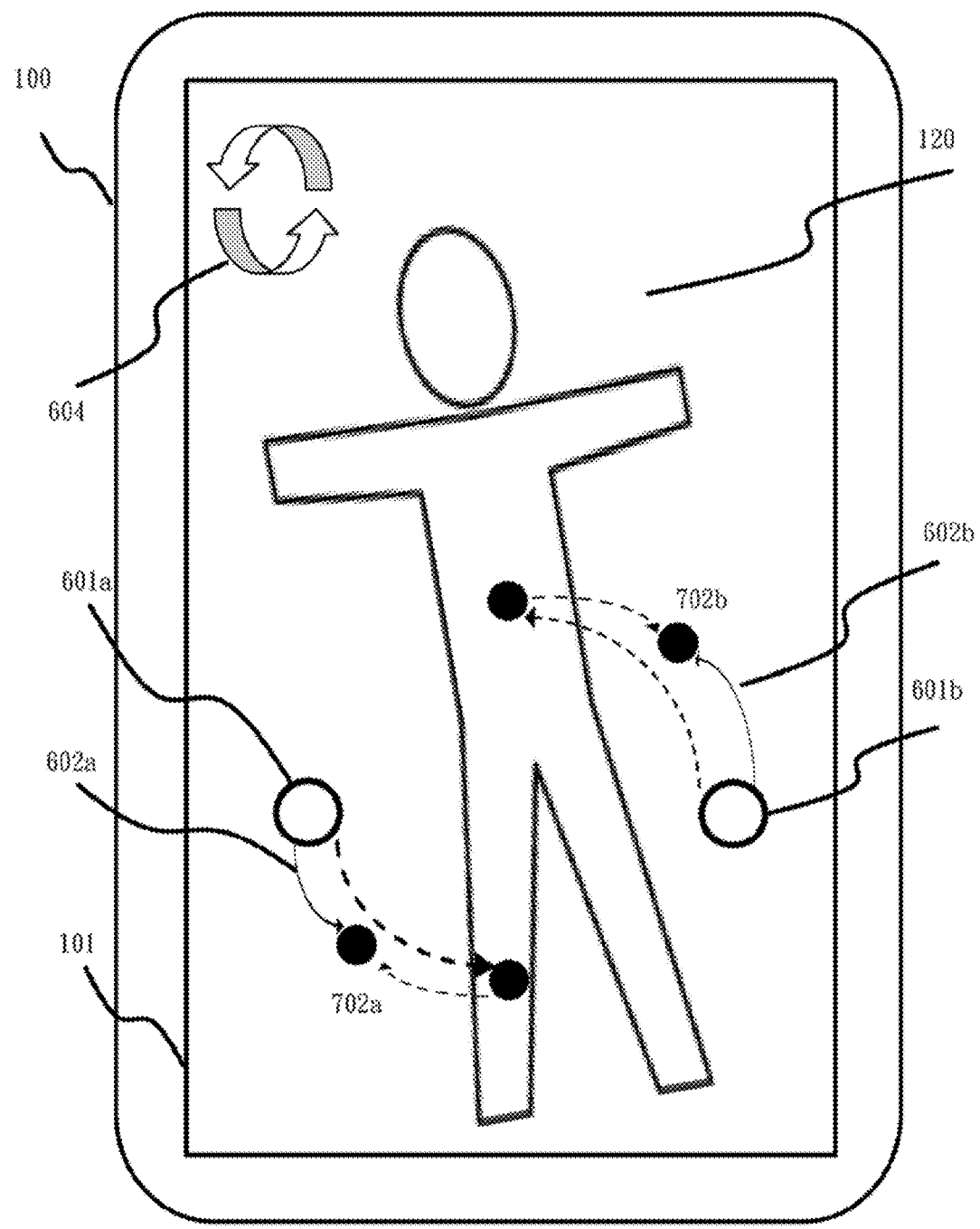
Figure 7D:
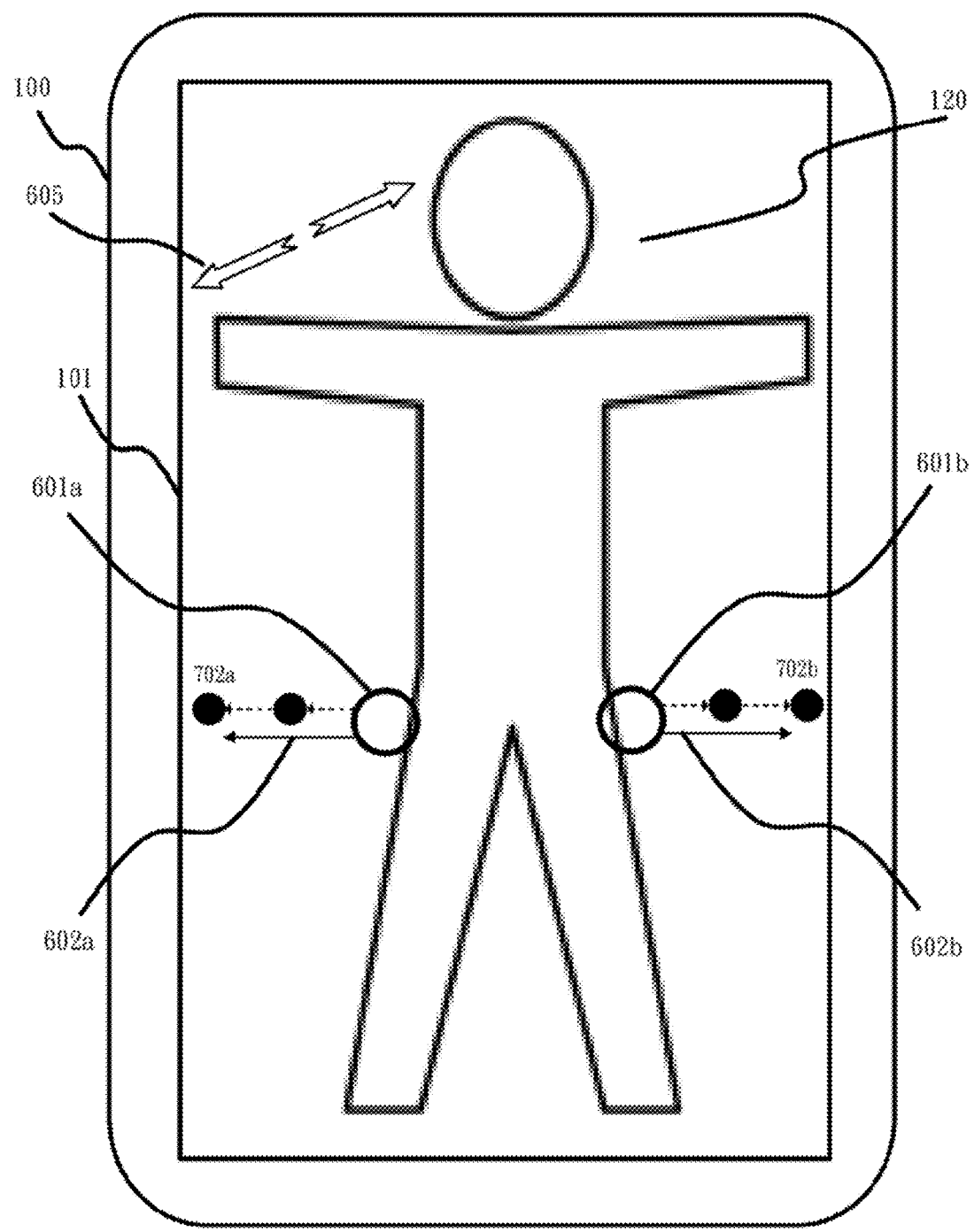
Figure 7E:
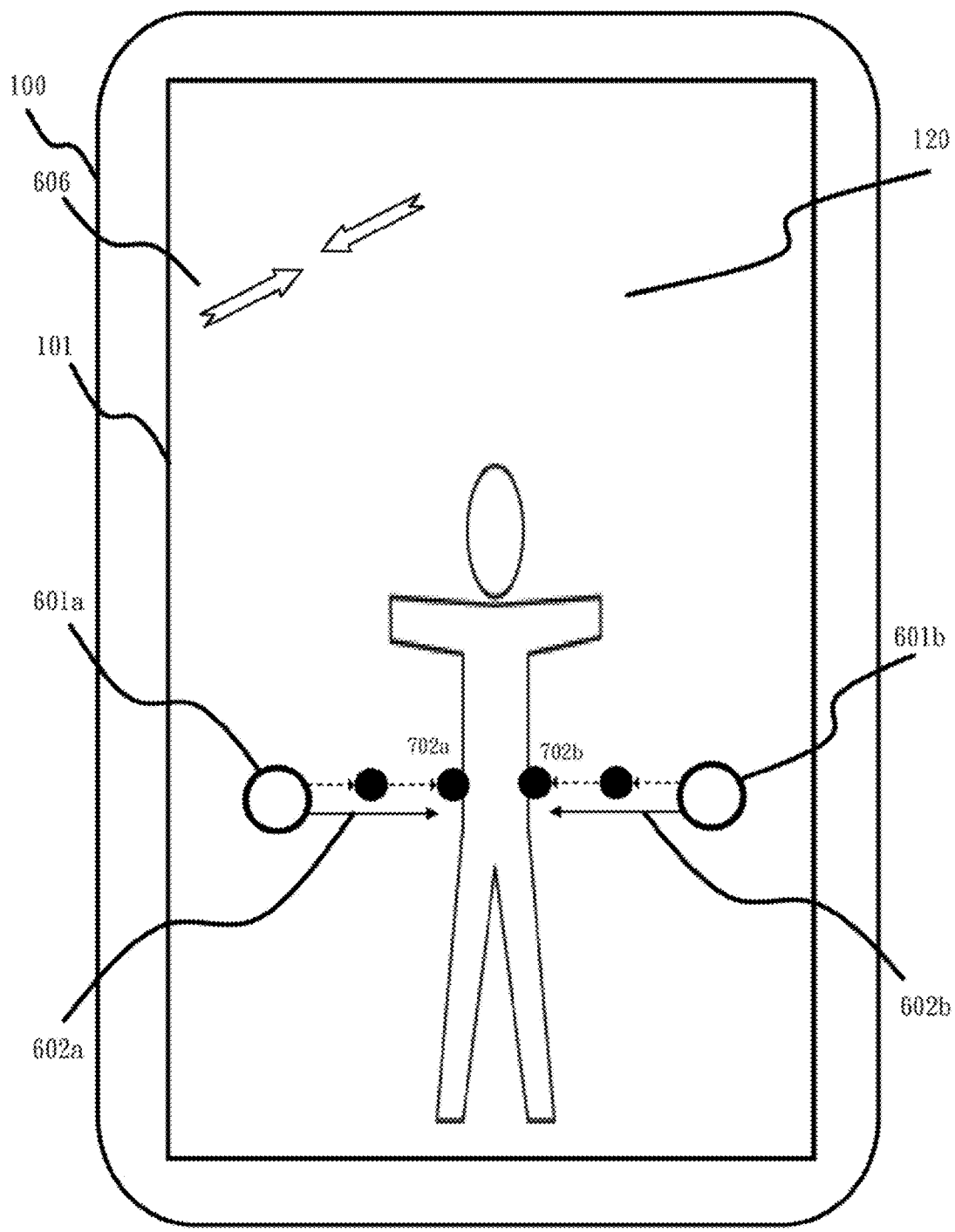

Please refer to FIGS. 7(A)-7(E), each of which respectively shows that the user's traveling paths stay at the original ending points and then move to the new ending points. In FIG. 7(B), the user's traveling paths firstly stay at the ending points at the coordinates (0.5,0.5) and (1.5,−0.5) as shown in FIG. 6(B), and then the user's traveling paths respectively move in the clockwise direction to the new ending points at coordinates (1,1) and (1,−1). In FIG. 7(C), the user's traveling paths firstly stay at the ending points at the coordinates (1,−1) and (1,1) as shown in FIG. 6(C), and then the user's traveling paths respectively change toward the clockwise direction to the new ending points at coordinates (0.5,−0.5) and (1.5,0.5). In FIG. 7(D), the user's traveling paths respectively stay at the ending points at the coordinates (−0.5,0) and (2.5,0) as shown in FIG. 6(D), and then the user's traveling paths keep moving outwardly to the new ending points at coordinates (−1,0) and (3,0). In FIG. 7(E), the user's traveling paths respectively stay at the ending points at the coordinates (0.25,0) and (1.75,0), and then the user's traveling paths keep moving inwardly to the new ending points at the coordinates (0.5,0) and (1.5,0). In this embodiment, the two traveling paths in FIG. 7(B) both have new traveling distances of 1.414 units long; the two traveling paths in FIG. 7(C) both have new traveling distances of 0.707 units long; the two traveling paths in FIG. 7(D) both have new traveling distances of 1 unit long; and the two traveling paths in FIG. 7(E) both have new traveling distances of 0.5 units long.

After the method determines the new action direction and the new action speed according to the new traveling distances and the new traveling directions, the on-screen object 120 is moved in the clockwise direction, moved in the counterclockwise direction, zoomed in, or zoomed out. The new action speeds of the on-screen object 120 in FIG. 7(B), FIG. 7(D) and FIG. 7(E) are two times faster than the original action speeds; and the new action speed of the on-screen object 120 in FIG. 7(C) is half of the original action speed.

According to one embodiment of the present invention, if the two new ending points are different from the two original ending points, the method can respectively display the arrow symbols 602a and 602b between the two starting symbols (601a, 601b) and the two new ending points (702a, 702b), and the arrow symbols 602a and 602b extend from the starting symbols (601a, 601b) to the new ending points (702a, 702b). Please note that the step of displaying the arrow symbols is not a necessary step of the present invention. According to another embodiment of the present invention, it is also applicable not to display the arrow symbols on the touch screen 101.

Please note that the order of executing the method for screen control on a touch screen of the present invention is not limited to the above description; it is understood that the order of execution may differ from that which is depicted.

Figure 8:
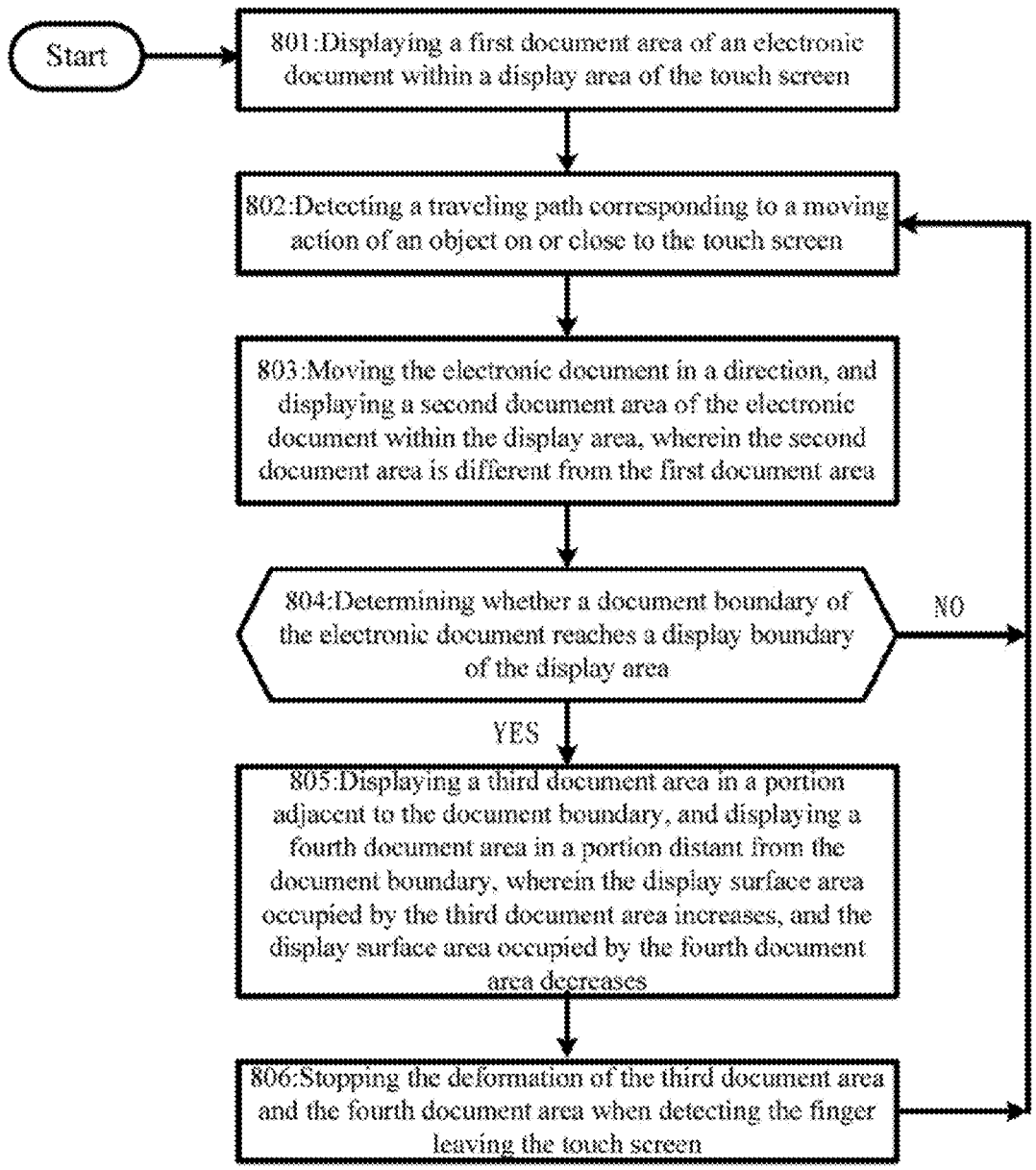
FIG. 8 illustrates a flowchart of moving the on-screen object according to one embodiment of the method for screen display on a touch screen of the present invention.
Figure 9B:
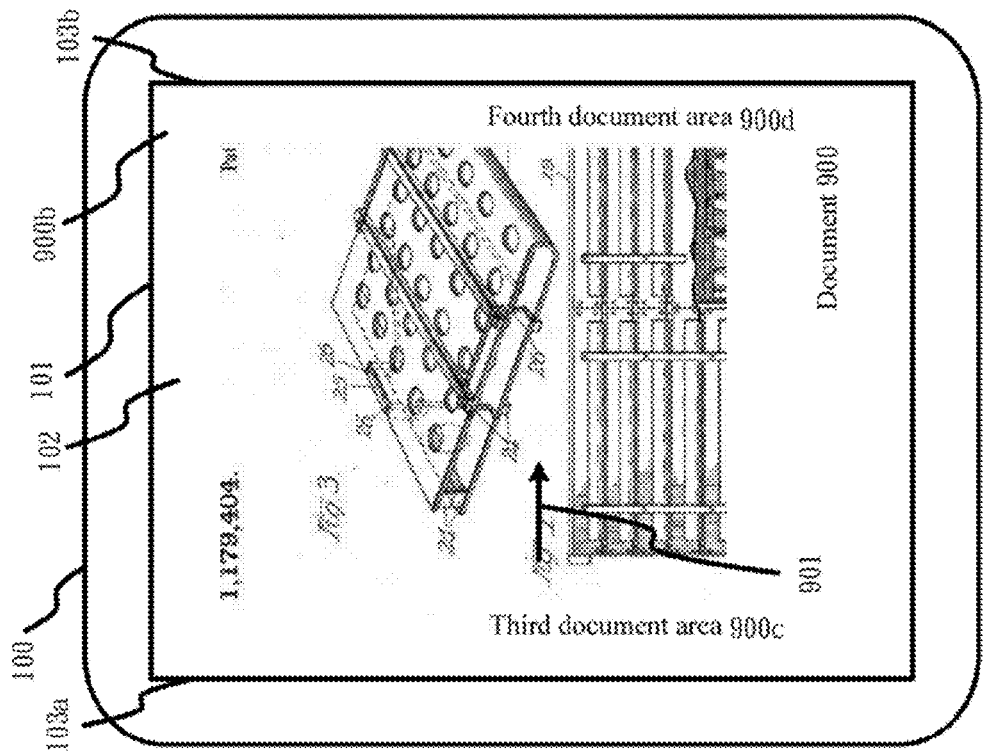
FIGS. 9(A)-9(D) illustrate schematic drawings of moving the on-screen object according to one embodiment of the method for screen display on a touch screen of the present invention.
Figure 9A:
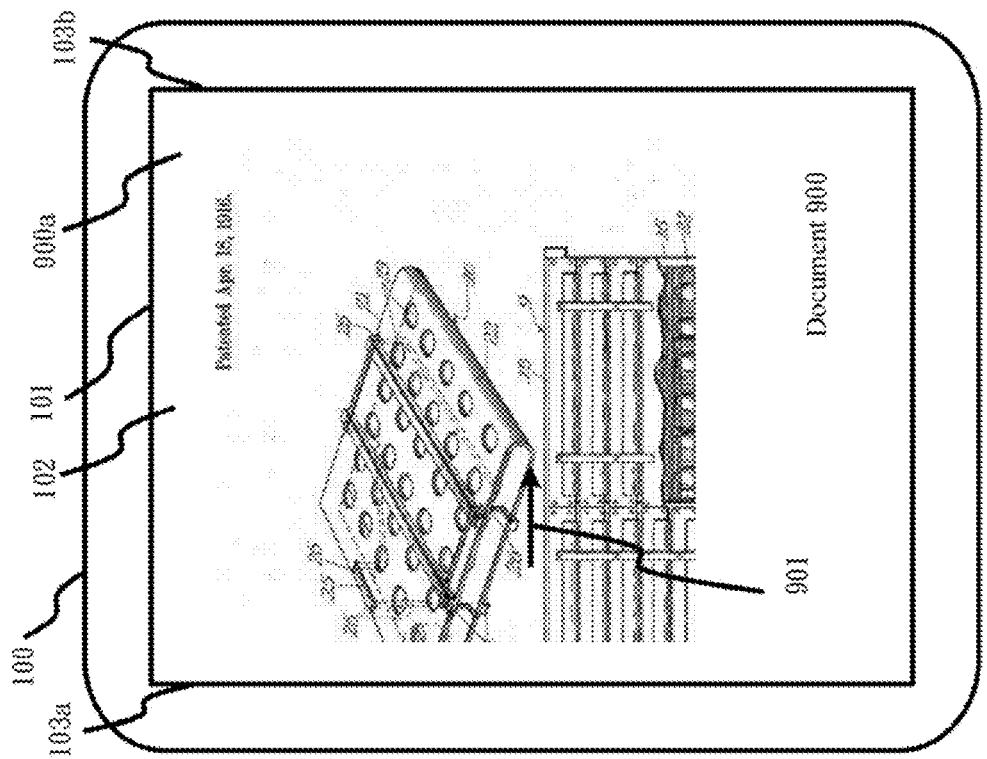
Figure 9D:
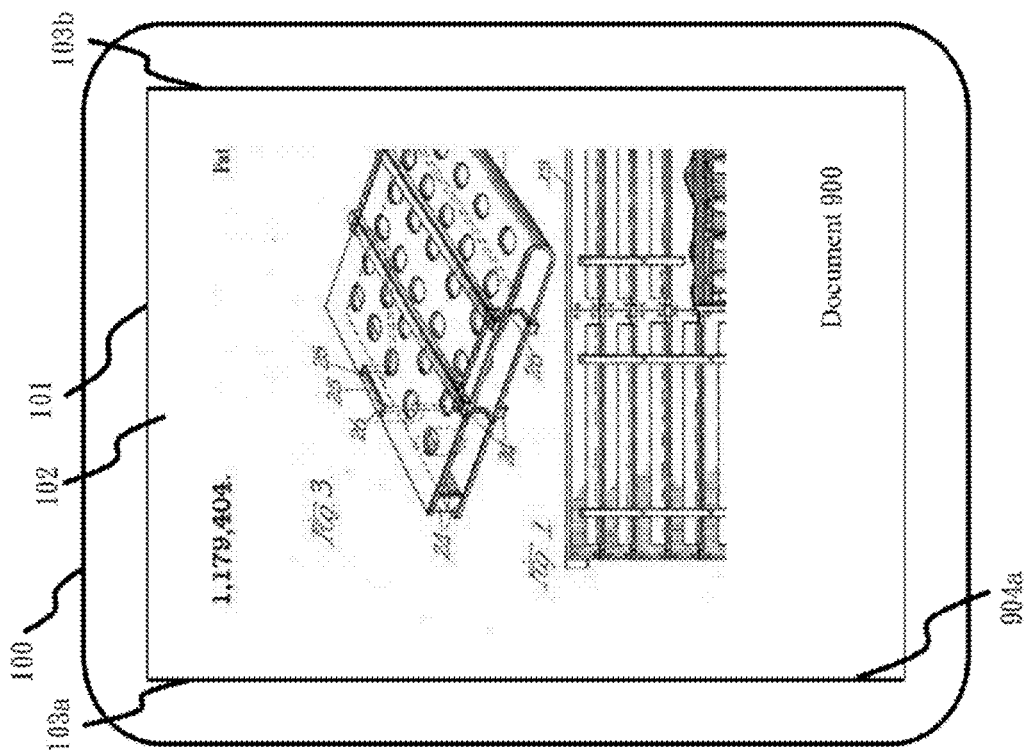
Figure 9C:
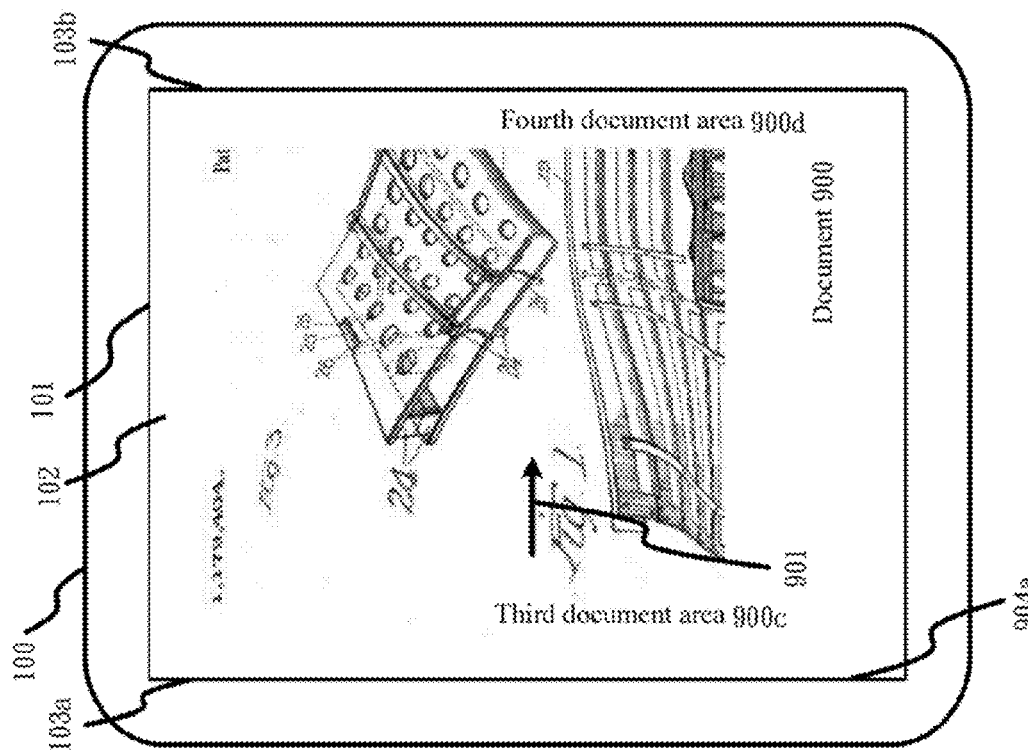
Figure 10:
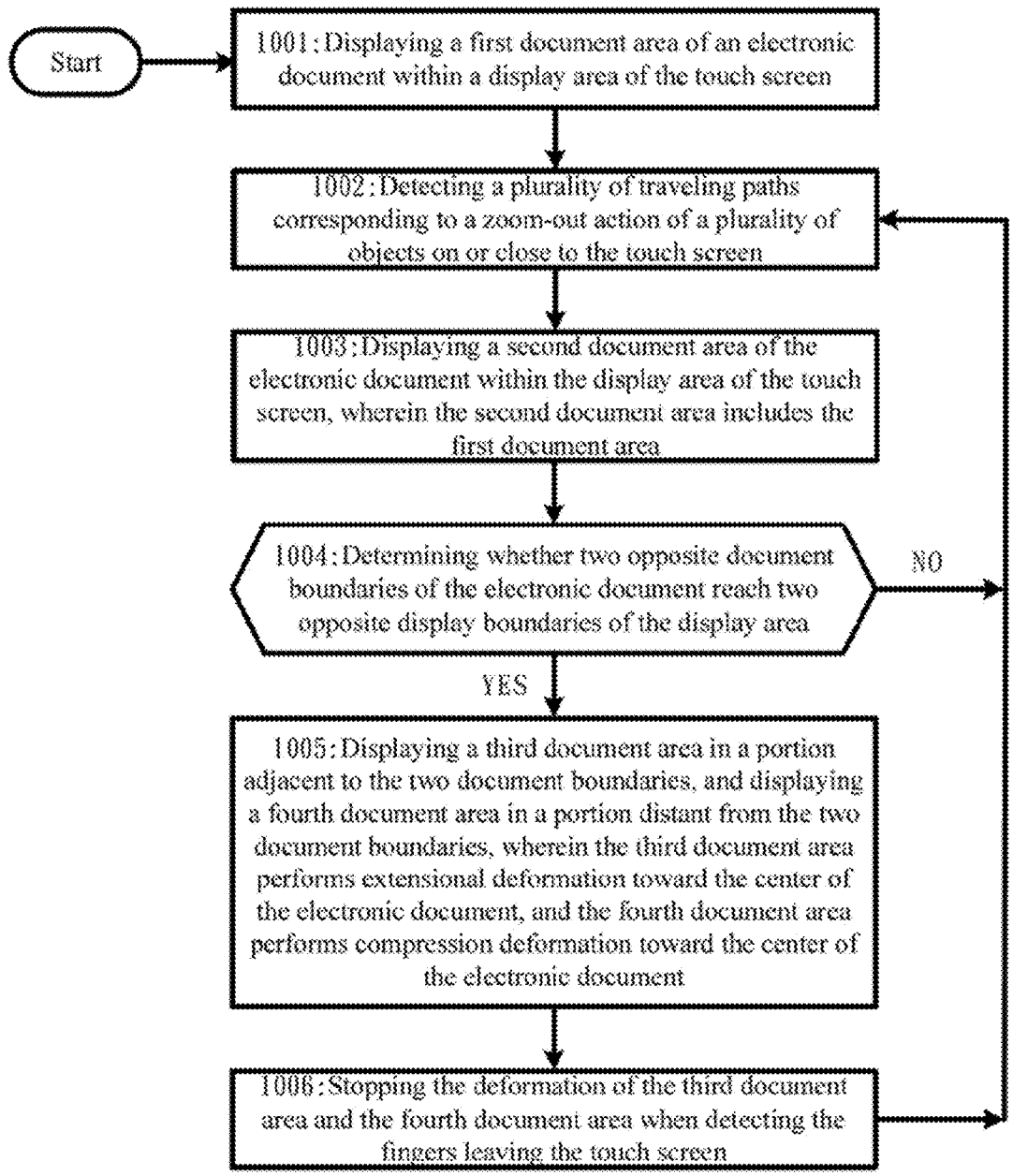
FIG. 10 illustrates a flowchart of zooming out the on-screen object according to one embodiment of the method for screen display on a touch screen of the present invention.
Figure 11C:
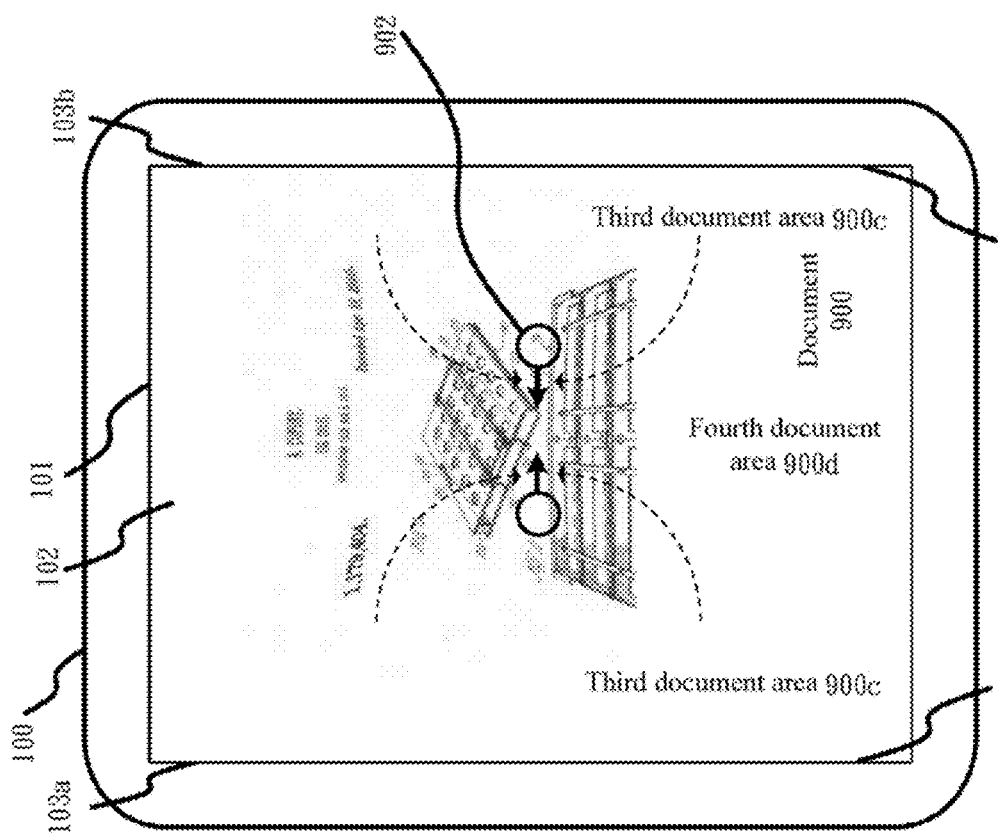
Figure 11D:
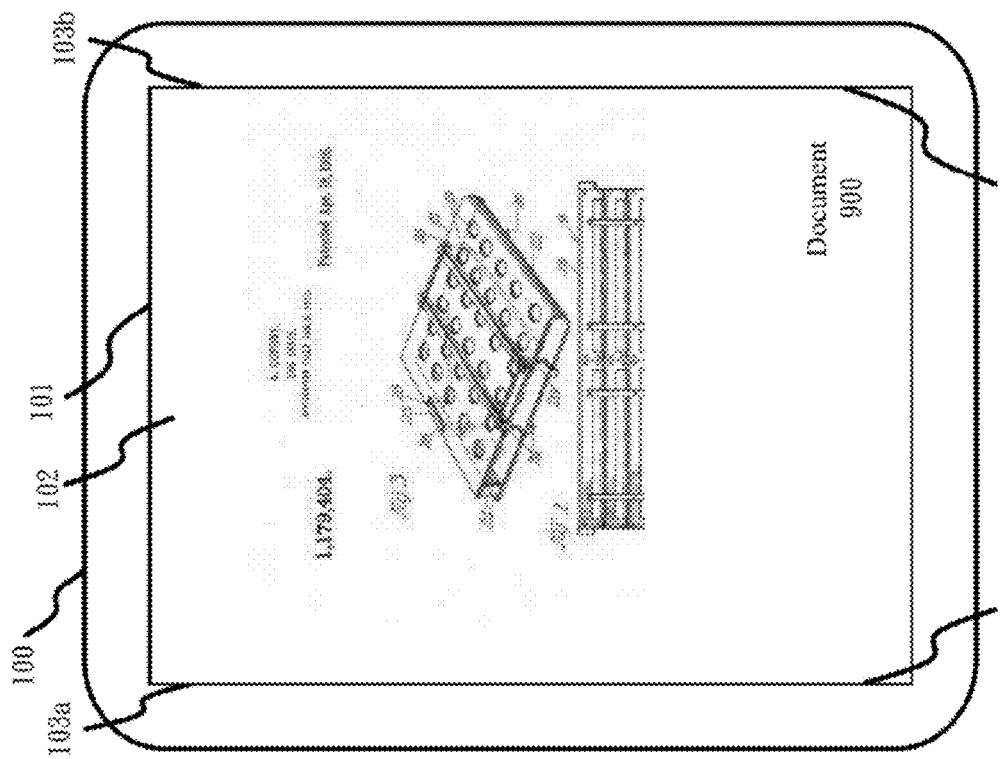
Figure 12:
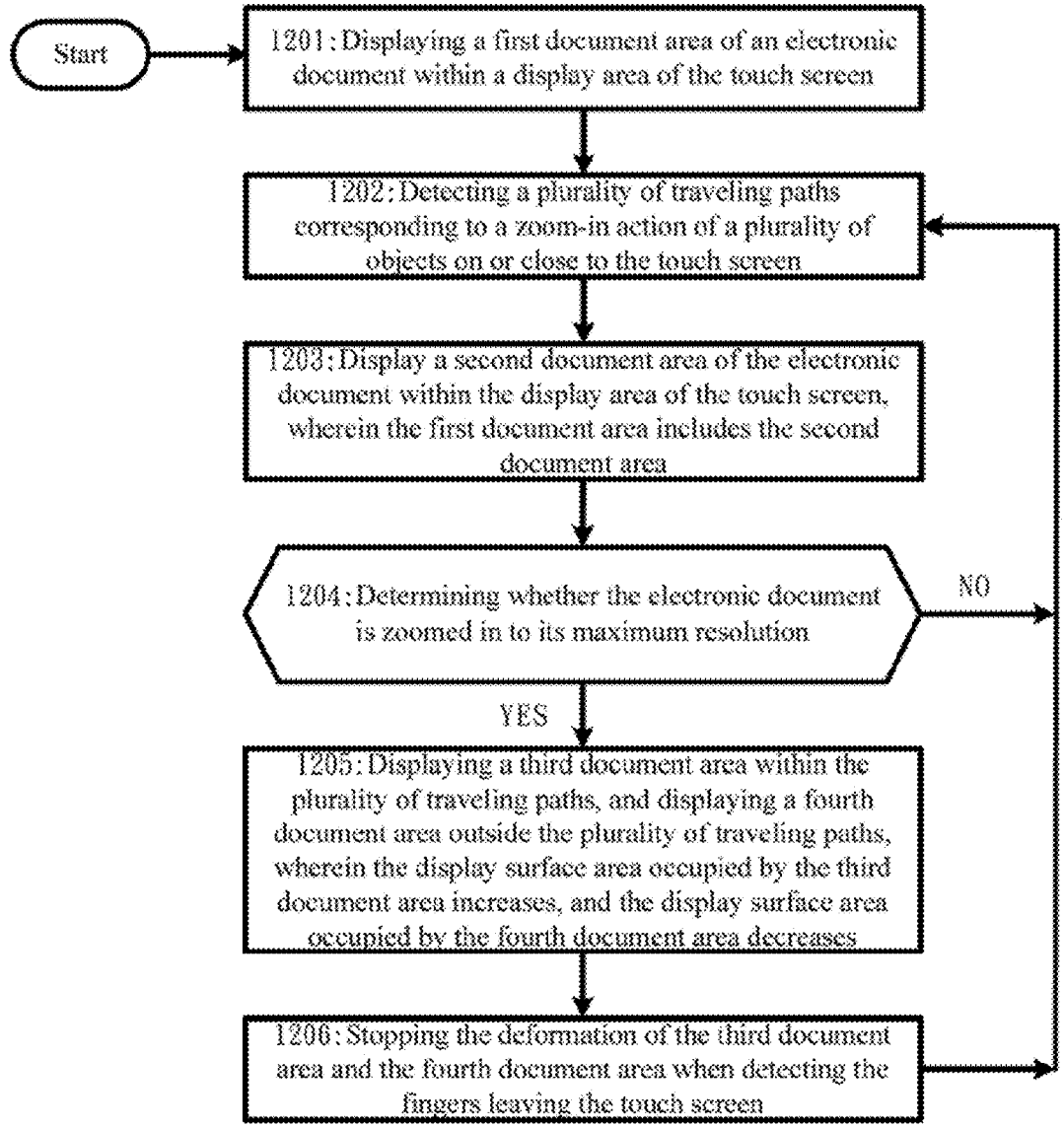
FIG. 12 illustrates a flowchart of zooming in the on-screen object according to one embodiment of the method for screen display on a touch screen of the present invention.

Next, please refer to FIG. 8, FIG. 10 and FIG. 12 related to flowcharts showing methods for screen display on a touch screen according to one embodiment of the present invention. According to one embodiment of the present invention, the method for screen display on a touch screen of the present invention comprises a method of moving the on-screen object, a method of zooming out the on-screen object, and a method of zooming in the on-screen object. FIG. 8 and FIG. 9 illustrate the method of moving the on-screen object according to one embodiment of the present invention; FIG. 10 and FIG. 11 illustrate the method of zooming out the on-screen object according to one embodiment of the present invention; and FIG. 12 and FIG. 13 illustrate the method of zooming in the on-screen object according to one embodiment of the present invention. The electronic device 100 shown in FIG. 1 is used as an example for explaining the method for screen display on a touch screen according to one embodiment of the present invention.

Firstly, please refer to FIG. 8, which illustrates a flowchart of moving the on-screen object according to one embodiment of the method for screen display on a touch screen of the present invention.

At first, the method performs step 801: displaying a first document area of an electronic document within a display area of the touch screen.

Please refer to FIG. 9(A); the touch screen 101 displays a first document area 900a of a document 900. According to one embodiment of the present invention, the electronic document can be a PDF-format document, an image file, a web page, an e-mail or the like.

Then the method performs step 802: detecting a traveling path corresponding to a moving action of an object on or close to the touch screen.

The electronic device 100 detects a traveling path 901 corresponding to a moving action of an object or a user's finger touching or being close to the touch screen 101, and determines the traveling path as an instruction of moving the electronic document in a first direction. According to one embodiment of the present invention, the traveling path 901 of the moving action moves to the right; therefore, the traveling path is determined as an instruction of moving the electronic document in the right direction. However, please note that the traveling path 901 of the moving action can be a traveling path moving toward any direction.

Then the method performs step 803: moving the electronic document in the first direction, and displaying a second document area of the electronic document within the display area, wherein the second document area is different from the first document area.

Please refer to FIG. 9(B); after the method detects the traveling path, the document 900 moves to the right so as to display a second document area 900b, wherein the second document area 900b is different from the first document area 900a. Basically, the traveling direction of the electronic document 900 is the same as the traveling direction of the object, and the moving distance and the moving speed of the electronic document 900 are corresponding to the distance and the speed of the traveling path of the object.

Then the method performs step 804: determining whether a document boundary of the electronic document reaches a display boundary of the display area.

During the process of moving the document 900, the method keeps determining whether any document boundary of the document 900 reaches a display boundary of the display area. In response to an affirmative determination, the method performs step 805; otherwise, the method keeps moving the electronic document, and returns to step 802 after the movement ends.

If one document boundary of the electronic document has reached a display boundary of the display area, the method then performs step 805: displaying a third document area in a portion adjacent to the document boundary, and displaying a fourth document area in a portion distant from the document boundary, wherein the display surface area occupied by the third document area increases, and the display surface area occupied by the fourth document area decreases.

Please refer to FIG. 9(C); during the process of moving the document 900, if the instruction of moving the electronic document in the right direction still exists (for example: the finger still moves to the right near the center location of the left display boundary 103a of the touch screen 101), and a left document boundary 904a has reached the left display boundary 103a, the method then displays the document 900 by way of deformation. The portion (i.e. the third document area 900c) adjacent to the left document boundary 904a performs radial extensional deformation from the traveling path 901 of the moving action to the right so as to increase the display surface area. Please refer to FIG. 9(C), the radial extensional deformation in this embodiment refers to: the portion of the third document area 900c above the traveling path 901 extending along the upper-right direction, the portion of the third document area 900c below the traveling path 901 extending along the lower-right direction, and the portion of the third document area 900c at the same height as the traveling path 901 horizontally extending to the right. Further, the portion (i.e., the fourth document area 900d) distant from the left document boundary 904a performs compression deformation to the right, such that the display surface area of the fourth document area 900d decreases. According to another embodiment of the present invention, with regard to the portion of the fourth document area, the method can move partial content of the fourth document area 900d out of the display area 102 so as to achieve the effect of reducing the display surface area. Similarly, when other boundaries of the document 900 (such as the upper, lower or right boundaries) reach other boundaries of the display area (such as the upper, lower or right boundaries), the method can also trigger the deformation effect. And according to another embodiment of the present invention, when the left document boundary 904a has reached the left display boundary 103a, the left document boundary 904a appears to be elastically attached to the left display boundary 103a.

According to another embodiment of the present invention, the method can further mix a document background color (normally a white or light color) of the third document area 900c with a desktop background color (normally a dark color, a gray color or a black color; visually distinct from the document background color) of the display area 102 to form a gray color, so as to display an effect that the thickness of the third document area 900c is reduced and becomes thinner due to the expansion of its display surface area; therefore, part of the desktop background color can be seen through the document. According to yet another embodiment of the present invention, a color-changing effect applied to a background color of the third document area 900c triggered by the deformation can be set as a default pink color, so as to remind the user that if the background color of the third document area 900c turns pink, the left document boundary 904a has reached the left display boundary 103a of the display area 102.

Then the method performs step 806: stopping the deformation of the third document area and the fourth document area when detecting the finger leaving the touch screen.

Please refer to FIG. 9(D); when the method detects that the finger leaves the touch screen 101, the deformation of the document 900 stops. As a result, after the finger leaves the touch screen 101, the third document area 900c and the fourth document area 900d will be displayed in their original size as shown in FIG. 9(B), and the third document area 900c in original size and the fourth document area 900d in the original size are displayed at the same magnification. According to another embodiment of the present invention, the document background color of the third document area 900c also returns to the white or light color, and the desktop background color in a dark or black color can no longer be seen through. According to yet another embodiment of the present invention, the default pink color applied to the background color of the third document area 900c due to the deformation will disappear as well.

After the finger leaves the touch screen 101, the method returns to step 802 to wait for the object to touch or be close to the touch screen 101 again. That is, the method will re-perform these steps in response to the traveling path of the moving action.

Next, please refer to FIG. 10, which illustrates a flowchart of zooming out the on-screen object according to one embodiment of the method for screen display on a touch screen of the present invention.

Firstly, the method performs step 1001: displaying a first document area of an electronic document within a display area of the touch screen.

Please refer to FIG. 11(A), the touch screen 101 displays a first document area 900a of a document 900.

Then the method performs step 1002: detecting a plurality of traveling paths corresponding to a zoom-out action of a plurality of objects on or close to the touch screen.

The electronic device 100 detects a plurality of traveling paths 902 corresponding to a zoom-out action of a plurality of objects or the user's fingers touching or being close to the touch screen 101, and determines the traveling paths as an instruction of zooming out the electronic document. According to one embodiment of the present invention, the traveling paths 902 of the zoom-out action moves inwardly from both the left and right sides; therefore, the method determines the traveling paths as the instruction of zooming out the electronic document by shrinking inwardly from both the left and right sides, but please note the scope of the present invention is not limited to the above description. For example, the traveling paths 902 of the zoom-out action can be the traveling paths of shrinking inwardly from any two opposite directions.

Then the method performs step 1003: displaying a second document area of the electronic document within the display area of the touch screen, wherein the second document area includes the first document area.

Please refer to FIG. 11(B), after the method detects the traveling paths, the document 900 is zoomed out by shrinking inwardly from both the left and right sides so as to display a second document area 900b, wherein this second document area 900b includes the content of the first document area 900a.

Then the method performs step 1004: determining whether two opposite document boundaries of the electronic document reach two opposite display boundaries of the display area.

During the process of zooming out the document, the method keeps determining whether two opposite document boundaries of the document reach two opposite display boundaries of the display area. In response to an affirmative determination, the method performs step 1005; otherwise, the method keeps zooming out the electronic document, and returns to step 1002 after the zoom-out action ends.

If the two opposite document boundaries of the electronic document have reached the two opposite display boundaries of the display area, the method moves on to step 1005: displaying a third document area in a portion adjacent to the two document boundaries, and displaying a fourth document area in a portion distant from the two document boundaries, wherein the third document area performs extensional deformation toward the center of the electronic document, and the fourth document area performs compression deformation toward the center of the electronic document.

Please refer to FIG. 11(C); when the instruction of zooming out the electronic document still exists, during the process of zooming out the document 900, if the left document boundary 904a has reached the left display boundary 103a of the display area, and the right document boundary 904b has reached the right display boundary 103b of the display area as well, the method then displays the document 900 by way of deformation. The portion (i.e. the third document area 900c) adjacent to the left document boundary 904a and the right document boundary 904b performs extensional deformation toward the center of the document 900; and the portion (i.e. the fourth document area 900d) distant from the left document boundary 904a and the right document boundary 904b performs compression deformation toward the center of the document 900.

According to another embodiment of the present invention, if other two opposite boundaries (such as the upper and lower boundaries) of the document 900 have reached other two opposite boundaries (such as the upper and lower boundaries) of the display area, the method also triggers the effect of document deformation. According to yet another embodiment of the present invention, the method can further mix a document background color (normally a white or light color) of the third document area 900c with a desktop background color (normally a dark color, a gray color or a black color; visually distinct from the document background color) of the display area 102 to form a gray color so as to display an effect that the thickness of the third document area 900c is reduced and becomes thinner due to the expansion of its display surface area; therefore, some of the desktop background color can be seen through the document.

Next, the method performs step 1006: stopping the deformation of the third document area 900c and the fourth document area 900d when detecting the fingers leaving the touch screen.

Please refer to FIG. 11(D); when the method detects that the fingers leave the touch screen 101, the deformation of the document 900 stops. Previously, the third document area 900c has performed extensional deformation toward the center of the document 900, and the fourth document area 900d has performed compression deformation toward the center of the document 900; however, after the fingers leave the touch screen 101, both document areas will be displayed in their original size, and the third document area 900c in original size and the fourth document area 900d in the original size are displayed at the same magnification. According to another embodiment of the present invention, the document background color of the third document area 900c also recovers to the white or light color, and the desktop background color in the dark or black color can no longer be seen through.

After the fingers leave the touch screen 101, the method returns to step 1002 to wait for the object to touch or be close to the touch screen 101 for the next time. That is, the method will re-perform these steps in response to the traveling paths of the zoom-out action.

Then please refer to FIG. 12, which illustrates a flowchart of zooming in the on-screen object according to one embodiment of the method for screen display on a touch screen of the present invention.

Firstly, the method performs step 1201: displaying a first document area of an electronic document within a display area of the touch screen.

Please refer to FIG. 13(A); the touch screen 101 displays a first document area 900a of a document 900.

Then the method performs step 1202: detecting a plurality of traveling paths corresponding to a zoom-in action of a plurality of objects on or close to the touch screen.

The electronic device 100 detects a plurality of traveling paths 903 corresponding to a zoom-in action of a plurality of objects or the user's fingers touching or being close to the touch screen 101, and determines the traveling paths as an instruction of zooming in the electronic document. According to one embodiment of the present invention, the traveling paths 903 of the zoom-in action move outwardly from both the left and right sides; therefore, the method interprets the traveling paths as the instruction of zooming in the electronic document by expanding outwardly from both the left and right sides, but please note the scope of the present invention is not limited to the above description. For example, the traveling paths 903 of the zoom-in action can be the traveling paths of expanding outwardly from any two opposite directions.

Then the method performs step 1203: displaying a second document area of the electronic document within the display area of the touch screen, wherein the first document area includes the second document area.

Please refer to FIG. 13(B); after the method detects the traveling paths, the document 900 is zoomed in by expanding outwardly from both the left and right sides so as to display a second document area 900b, wherein the first document area 900a includes the content of the second document area 900b.

Then the method performs step 1204: determining whether the electronic document is zoomed in to its maximum resolution.

During the process of zooming in the document, the method keeps determining whether the document is zoomed in to its maximum resolution. In response to an affirmative determination, the method performs step 1205; otherwise, the method keeps zooming in the electronic document, and returns to step 1202 after the zoom-in action ends.

If the electronic document is zoomed in to its maximum resolution, the method moves on to step 1205: displaying a third document area within the plurality of traveling paths, and displaying a fourth document area outside the plurality of traveling paths, wherein the display surface area occupied by the third document area increases, and the display surface area occupied by the fourth document area decreases.

Figure 13D:
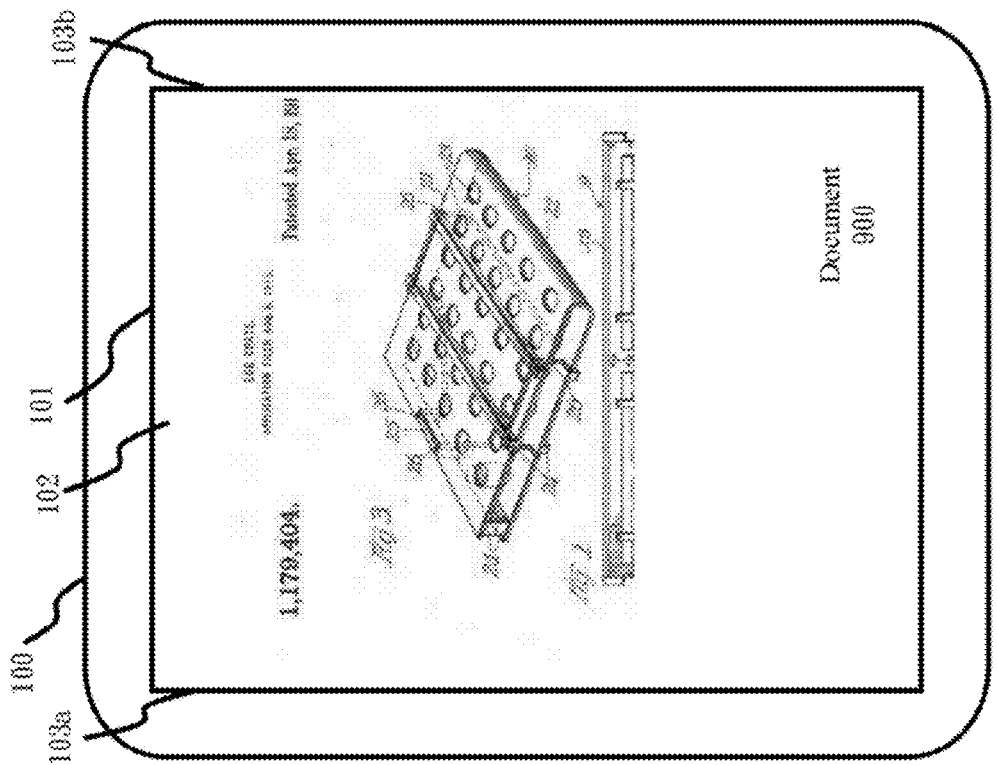
Figure 13C:
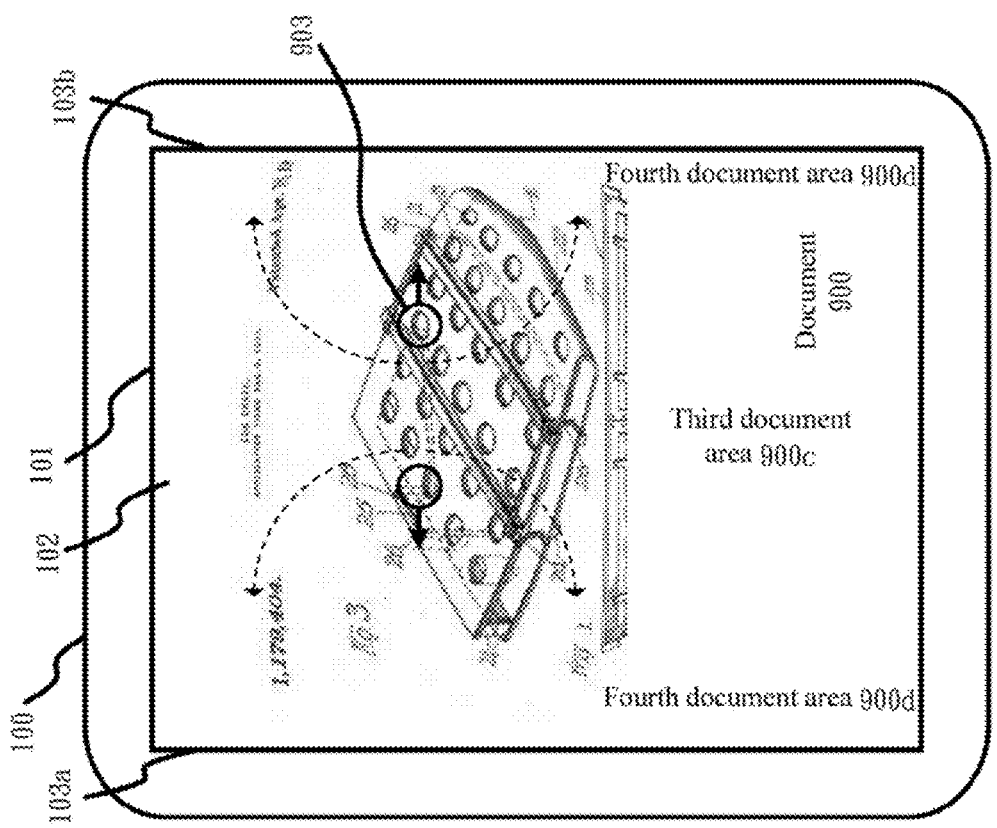

Please refer to FIG. 13(C); when the instruction of zooming in the electronic document still exists, during the process of zooming in the document 900, if the document 900 is zoomed in to its maximum resolution, the method then displays the document 900 by way of deformation. The portion (i.e. the third document area 900c) within the traveling paths 903 of the zoom-in action performs extensional deformation to increase the display surface area; and the portion (i.e. the fourth document area 900d) outside the traveling paths 903 of the zoom-in action moves out of the display area 102 to decrease the display surface area.

According to another embodiment of the present invention, the method can further mix a document background color (normally a white or light color) of the third document area 900c with a desktop background color (normally a dark color, a gray color or a black color; visually distinct from the document background color) of the display area 102 to form a gray color so as to display an effect that the thickness of the third document area 900c reduces and becomes thinner due to the expansion of its display surface area; therefore, some of the desktop background color can be seen through the document.

Then the method performs step 1206: stopping the deformation of the third document area and the fourth document area when detecting the fingers leaving the touch screen.

Please refer to FIG. 13(D); when the method detects that the fingers leave the touch screen 101, the deformation of the document 900 stops. That is, the third document area 900c stops the extensional deformation, and the fourth document area 900d stops moving its portion out of the display area 102, and the third document area 900c and the fourth document area 900d will be displayed in their original size after the fingers leave the touch screen 101, and the third document area 900c in original size and the fourth document area 900d in the original size are displayed at the same magnificatio. According to another embodiment of the present invention, the document background color of the third document area 900c also returns to the white or light color, and the desktop background color in a dark or black color can no longer be seen through.

After the fingers leave the touch screen 101, the method returns to step 1202 to wait for the object to touch or be close to the touch screen 101 for the next time. That is, the method would re-perform these steps in response to the traveling paths of the zoom-in action.

Although the present invention has been explained in relation to its preferred embodiments, it is to be understood that many other possible modifications and variations can be made without departing from the spirit and scope of the invention as hereinafter claimed.

What is claimed is:

1. A method for screen control on a touch screen, used for controlling an on-screen object on a touch screen, the method comprising:
    detecting a path of movement for an object on or close to the touch screen, including:
        determining (1) whether the object touches or is close to a location of the touch screen at least two times within a first predefined period, or (2) whether the object stays at a location for more than a second predefined period;
        in response to detecting (1) or (2), setting the location as a starting point of the traveling path; and
        detecting a first ending point of the traveling path;
    computing a first traveling distance and a first traveling direction of the traveling path according to the starting point and the first ending point;
    determining a first action direction and a first action speed according to the first traveling distance and the first traveling direction, wherein the first action speed is proportional to the first traveling distance, and the first action direction is parallel to the first traveling direction; and
    before the object moving away from the first end point, repeatedly moving the on-screen object according to the first action direction and the first action speed.

2. The method for screen control on a touch screen as claimed in claim 1, further comprising:
    computing a horizontal angle between the first traveling direction and a horizontal axis;
    when the horizontal angle is smaller than a first predefined angle, the first action direction is defined as parallel to a horizontal-axis direction, and horizontally moving the on-screen object based on the first action speed.

3. The method for screen control on a touch screen as claimed in claim 1, further comprising:
    computing a vertical angle between the first traveling direction and a vertical axis;
    when the vertical angle is smaller than a second predefined angle, the first action direction is defined as parallel to a vertical-axis direction, and vertically moving the on-screen object based on the first action speed.

4. The method for screen control on a touch screen as claimed in claim 1, further comprising:
    displaying a starting symbol at the starting point; and
    displaying an arrow symbol, wherein the arrow symbol extends from the starting symbol and along the first traveling direction, and the length of the arrow symbol is proportional to the first traveling distance.

5. The method for screen control on a touch screen as claimed in claim 1, further comprising:
    before the object moving away from the touch screen, repeatedly detecting an ending point of the traveling path to obtain a second ending point;
    when the second ending point is different from the first ending point, computing a second traveling distance and a second traveling direction of the traveling path according to the starting point and the second ending point;
    determining a second action direction and a second action speed according to the second traveling distance and the second traveling direction, wherein the second action speed is proportional to the second traveling distance, and the second action direction is parallel to the second traveling direction; and
    instead of based on the first action direction and the first action speed, moving the on-screen object according to the second action direction and the second action speed.

6. The method for screen control on a touch screen as claimed in claim 5, further comprising:
    when the second ending point is different from the first ending point, displaying the arrow symbol, wherein the arrow symbol extends from the starting symbol and along the second traveling direction, and the length of the arrow symbol is proportional to the second traveling distance.

7. The method for screen control on a touch screen as claimed in claim 1, further comprising:
    determining whether the first traveling distance is smaller than an tolerance threshold; and
    in response to an affirmative determination, ending the method for screen control on the touch screen.

8. A method for screen control on a touch screen, used for controlling an on-screen object on a touch screen, the method comprising:
    detecting a first traveling path of a first object on or close to the touch screen, and detecting a second traveling path of a second object on or close to the touch screen, including:
        detecting a first starting point of the first traveling path;
        detecting a first ending point of the first traveling path;
        detecting a second starting point of the second traveling path; and
        detecting a second ending point of the second traveling path;
    computing a first traveling distance and a first traveling direction based on the first starting point and the first ending point, and computing a second traveling distance and a second traveling direction based on the second starting point and the second ending point;
    determining a first action direction based on to the first traveling direction, and the second traveling direction;
    determining a first action speed based on the first traveling distance and, the second traveling distance; and
    before the object moving away from one of the first end point and the second end point, repeatedly performing a multi-point control action according to the first action direction and the first action speed, wherein the multi-point control action includes:
        performing an action of rotating the on-screen object; or
        performing an action of zooming in or out the on-screen object.

9. The method for screen control on a touch screen as claimed in claim 8, further comprising:
    before the object moving away from the touch screen, repeatedly detecting an ending point of the first traveling path to obtain a third ending point, and repeatedly detecting an ending point of the second traveling path to obtain a fourth ending point;
    when the third ending point is different from the first ending point, computing a third traveling distance and a third traveling direction based on the first starting point and the third ending point;
    when the fourth ending point is different from the second ending point, computing a fourth traveling distance and a fourth traveling direction based on the second starting point and the fourth ending point;

determining a second action direction of the on-screen object according to the third traveling direction and the fourth traveling direction;

determining a second a second action speed of the on-screen object according to the third traveling distance and the fourth traveling distance; and before the object moving away from one of the third end point and the fourth end point, repeatedly performing the multi-point control action according to the second action direction and the second action speed.

10. The method for screen control on a touch screen as claimed in claim 8, further comprising:

when the first traveling direction and the second traveling direction are substantially located on the same straight line, performing the action of zooming in or out the on-screen object.

11. The method for screen control on a touch screen as claimed in claim 10, further comprising:

when the first traveling direction and the second traveling direction substantially extend along a clockwise direction instead of being located on the same straight line, performing the action of rotating the on-screen object in the clockwise direction; and when the first traveling direction and the second traveling direction substantially extend along a counterclockwise direction instead of being located on the same straight line, performing the action of rotating the on-screen object in the counterclockwise direction.

12. The method for screen control on a touch screen as claimed in claim 10, further comprising:

displaying a zoom-in symbol or a zoom-out symbol while performing the action of zooming in or out the on-screen object.

13. The method for screen control on a touch screen as claimed in claim 11, further comprising:

displaying a clockwise symbol while performing the action of rotating the on-screen object in the clockwise direction; and displaying a counterclockwise symbol while performing the action of rotating the on-screen object in the counterclockwise direction.

14. The method for screen control on a touch screen as claimed in claim 8, further comprising:

displaying a first starting symbol at the first starting point, and displaying a second starting symbol at the second starting point; and displaying a first arrow symbol between the first starting symbol and the first ending point, wherein the first arrow symbol extends from the first starting symbol to the first ending point, and displaying a second arrow symbol between the second starting symbol and the second ending point, wherein the second arrow symbol extends from the second starting symbol to the second ending point.

15. The method for screen control on a touch screen as claimed in claim 8, further comprising:

before the object moving away from one of the third end point and the fourth end point, repeatedly detecting an ending point of the first traveling path to obtain a third ending point, and repeatedly detecting an ending point of the second traveling path to obtain a fourth ending point;

when the third ending point is different from the first ending point, displaying a first arrow symbol between the first starting symbol and the third ending point, wherein the first arrow symbol extends from the first starting symbol to the third ending point; and when the fourth ending point is different from the second ending point, displaying a second arrow symbol between the second starting point and the fourth ending point, wherein the second arrow symbol extends from the second starting symbol to the fourth ending point.

16. The method for screen control on a touch screen as claimed in claim 8, further comprising:

determining (1) whether the first object touches or is close to a first location of the touch screen at least two times within a first predefined period, or (2) whether the first object stays at the first location for a second predefined period;

in response to detecting (1) or (2), setting the first location as the first starting point and starting to detect the first traveling path;

detecting (3) whether the second object touches or is close to a second location of the touch screen at least two times within the first predefined period, or (4) whether the second object stays at the second location for the second predefined period; and when detecting (3) or (4), setting the second location as the second starting point and starting to detect the second traveling path.

17. The method for screen control on a touch screen as claimed in claim 8, further comprising:

when the first traveling distance of the first traveling path and the second traveling distance of the second traveling path are both smaller than a tolerance threshold, terminating the method for screen control on the touch screen.

* * * * *